(12) United States Patent
Tang et al.

(10) Patent No.: US 12,282,357 B2
(45) Date of Patent: Apr. 22, 2025

(54) SUPPORT APPARATUS AND FOLDABLE ELECTRONIC DEVICE

(71) Applicant: Honor Device Co., Ltd., Shenzhen (CN)

(72) Inventors: Yangjie Tang, Shenzhen (CN); Yameng Wei, Shenzhen (CN); Lei Feng, Shenzhen (CN); Yuan Wang, Shenzhen (CN); Wenxing Yao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/005,430

(22) PCT Filed: Apr. 27, 2022

(86) PCT No.: PCT/CN2022/089574
§ 371 (c)(1),
(2) Date: Jan. 13, 2023

(87) PCT Pub. No.: WO2023/015957
PCT Pub. Date: Feb. 16, 2023

(65) Prior Publication Data
US 2024/0248512 A1     Jul. 25, 2024

(30) Foreign Application Priority Data

Aug. 11, 2021 (CN) .......................... 202110916880.7
Feb. 10, 2022 (CN) .......................... 202210126131.9

(51) Int. Cl.
*G06F 1/16* (2006.01)
*H04M 1/02* (2006.01)

(52) U.S. Cl.
CPC .......... *G06F 1/1616* (2013.01); *G06F 1/1681* (2013.01); *H04M 1/0216* (2013.01)

(58) Field of Classification Search
CPC .... G06F 1/1616; G06F 1/1681; G06F 1/1618; G06F 1/1652; G06F 1/1656; H04M 1/0216; H04M 1/0268; H04M 1/18
See application file for complete search history.

(56) References Cited

U.S. PATENT DOCUMENTS 7,236,357 B2 * 6/2007 Chen ..................... G06F 1/1656
361/679.55
9,389,648 B2 * 7/2016 Senatori ................ G06F 1/1681
(Continued)

FOREIGN PATENT DOCUMENTS

CN         107547700 A       1/2018
CN         110740603 A       1/2020
(Continued)

*Primary Examiner* — Rockshana D Chowdhury
*Assistant Examiner* — Martin Antonio Asmat Uceda
(74) *Attorney, Agent, or Firm* — Slater Matsil, LLP

(57) ABSTRACT

A support apparatus and a foldable electronic device are provided. The support apparatus includes a hinge assembly, a first housing, a second housing, and a first flexible sealing member. The hinge assembly includes a rotating shaft mechanism and a shaft cover, where the rotating shaft mechanism is fastened to the shaft cover. The first housing and the second housing are respectively located on two opposite sides of the hinge assembly, the first housing and the second housing are configured to rotate relative to the shaft cover through the rotating shaft mechanism, the first housing, the second housing, and the rotating shaft mechanism each have a support surface for supporting a foldable screen, and a first movement gap is present between the first housing and an outer surface of the shaft cover. The first flexible sealing member fits into and seals the first movement gap.

19 Claims, 14 Drawing Sheets

(56) References Cited

U.S. PATENT DOCUMENTS

| | | | |
|---|---|---|---|
| 10,104,790 B2 | 10/2018 | Lee et al. | |
| 10,754,205 B2 | 8/2020 | Metin et al. | |
| 10,928,860 B2 | 2/2021 | Park et al. | |
| 11,054,869 B2 | 7/2021 | Moon | |
| 11,073,863 B2* | 7/2021 | Kim | G06F 1/1656 |
| 11,079,812 B1* | 8/2021 | Bushnell | G06F 1/1626 |
| 11,615,720 B2* | 3/2023 | Park | G06F 1/1616 |
| | | | 361/679.01 |
| 11,803,214 B2* | 10/2023 | Yang | G06F 1/1652 |
| 12,069,192 B2* | 8/2024 | Fan | H04M 1/0214 |
| 12,072,742 B2* | 8/2024 | Kim | G06F 1/1618 |
| 2009/0206558 A1* | 8/2009 | Nameki | F16J 15/164 |
| | | | 277/644 |
| 2021/0026406 A1 | 1/2021 | Kim et al. | |
| 2021/0397228 A1 | 12/2021 | Yang et al. | |
| 2022/0300042 A1* | 9/2022 | Heo | G06F 1/1656 |

FOREIGN PATENT DOCUMENTS

| | | |
|---|---|---|
| CN | 210123987 U | 3/2020 |
| CN | 111818200 A | 10/2020 |
| CN | 111828461 A | 10/2020 |
| CN | 112019663 A | 12/2020 |
| CN | 113067922 A | 7/2021 |
| CN | 214507132 U | 10/2021 |
| CN | 113823186 A | 12/2021 |
| EP | 3812877 A1 | 10/2020 |

\* cited by examiner

SUPPORT APPARATUS AND FOLDABLE ELECTRONIC DEVICE

CROSS-REFERENCE TO RELATED APPLICATIONS

This application is a National Stage of International Application No. PCT/CN2022/089574, filed Apr. 27, 2022, which claims priority to Chinese Patent Application No. 202110916880.7, filed on Aug. 11, 2021, and Chinese Patent Application No. 202210126131.9, filed on Feb. 10, 2022. The disclosures of each of the aforementioned applications are incorporated herein by references in their entireties.

TECHNICAL FIELD

This application relates to the field of electronic technologies, and in particular, to a support apparatus and a foldable electronic device.

BACKGROUND

With the development of electronic technologies, foldable electronic devices are increasingly favored by users. To support folding of a foldable electronic device, two housings of the foldable electronic device are connected through a hinge assembly. The hinge assembly allows the two housings to rotate relative to each other to fold or unfold the foldable electronic device. To ensure that each housing rotates without interference, a gap is present between the housing and a shaft cover of the hinge assembly. However, the gap leads to poor sealing, waterproof and dustproof effects of the foldable electronic device.

SUMMARY

Embodiments of this application provide a support apparatus and a foldable electronic device, and the foldable electronic device has good sealing performance.

To achieve the foregoing objective, the following technical solutions are used in the embodiments of this application.

According to a first aspect, this application provides a support apparatus. The support apparatus includes a hinge assembly, a first housing, a second housing, and a first flexible sealing member. The hinge assembly includes a rotating shaft mechanism and a shaft cover, where the rotating shaft mechanism is fastened to the shaft cover. The first housing and the second housing are respectively located on two opposite sides of the hinge assembly, the first housing and the second housing are configured to rotate relative to the shaft cover through the rotating shaft mechanism, the first housing, the second housing, and the rotating shaft mechanism each have a support surface for supporting a foldable screen, and a first movement gap is present between the first housing and an outer surface of the shaft cover. The first flexible sealing member fits into and seals the first movement gap.

In the support apparatus in the embodiments of this application, the first flexible sealing member fits into and seals the first movement gap. Because the first flexible sealing member is compact, non-porous, soft, and deformable, the first flexible sealing member is used to seal the first movement gap to achieve waterproof and dustproof effects of the foldable electronic device, thereby preventing moisture and dust outside the foldable electronic device from entering inside of the foldable electronic device through the first movement gap, and further ensuring that the first housing moves relative to the hinge assembly without much obstruction.

In some embodiments of the first aspect of this application, there may be one first flexible sealing member or a plurality of first flexible sealing members arranged in parallel.

In some embodiments of the first aspect of this application, the first flexible sealing member includes a flexible body portion and a flexible abutting rib, the flexible body portion is fastened to one of the first housing and the shaft cover, and the flexible abutting rib is fastened to the flexible body portion and abuts against the other one of the first housing and the shaft cover. Therefore, when the flexible body portion is fastened to the first housing, the flexible abutting rib abuts against the shaft cover; and when the flexible body portion is fastened to the shaft cover, the flexible abutting rib abuts against the first housing. In this way, the flexible abutting rib abuts against the other one of the first housing and the shaft cover, which helps improve a sealing effect.

Optionally, a cross section of the flexible abutting rib is triangular, semicircular, or wedge-shaped.

In some embodiments of the first aspect of this application, the first flexible sealing member includes a flexible body portion, the flexible body portion is fastened to one of the first housing and the shaft cover, the other one of the first housing and the shaft cover is provided with a rib, and the rib abuts against the flexible body portion. Therefore, when the flexible body portion is fastened to the first housing, the shaft cover is provided with the rib abutting against the flexible body portion. When the flexible body portion is fastened to the shaft cover, the first housing is provided with the rib abutting against the flexible body portion. In this way, the sealing effect is achieved by the rib abutting against the flexible body portion.

In some embodiments of the first aspect of this application, the flexible body portion forms the first flexible sealing member, which facilitates processing and manufacture of the first flexible sealing member, and also facilitates cooperation between the first flexible sealing member and the rib. This prevents the flexible abutting rib of the first flexible sealing member from interfering with the rib during the rotation of the first housing relative to the shaft cover, thereby avoiding impact on a hand feel of rotating the foldable electronic device.

In some embodiments of the first aspect of this application, the rib is integrally formed with a wall plate in which the rib is located. In other words, when the rib is disposed on the first housing, the rib is integrally formed with the wall plate that is on the first housing and in which the rib is located. This helps improve structural strengths of the rib and the wall plate in which the rib is located, and increase the service life of the rib.

In some embodiments of the first aspect of this application, the rib is a metal member or a hard plastic member. This helps improve an effect of the rib abutting against the flexible body portion, delivering reliable sealing performance.

In some embodiments of the first aspect of this application, an embedded groove is formed on one of the first housing and the shaft cover, the first flexible sealing member includes a flexible body portion, and the flexible body portion is disposed in the embedded groove. The embedded groove is disposed to accommodate at least part of the first flexible sealing member, thereby limiting the first flexible sealing member by using the embedded groove. This allows the first flexible sealing member to be reliably connected to either the first housing or the shaft cover, preventing the first flexible sealing member from being displaced during the rotation of the first housing relative to the shaft cover.

In some embodiments of the first aspect of this application, a retaining groove is formed on a groove surface of the embedded groove, and a protruding portion adapted to the retaining groove is formed on the flexible body portion. In this way, the embedded groove can better limit the first flexible sealing member.

In some embodiments of the first aspect of this application, in a direction from a bottom surface of the embedded groove to a notch of the embedded groove, opposite groove surfaces of the embedded groove obliquely extend toward each other. In this way, the embedded groove can better limit the first flexible sealing member.

In some embodiments of the first aspect of this application, the first flexible sealing member is integrally formed with a wall plate in which the first flexible sealing member is located, thereby improving connection strength between the first flexible sealing member and the wall plate, simplifying a processing technology, and reducing production costs.

In some embodiments of the first aspect of this application, the first housing includes a first middle plate, a first back cover, and a first side frame. The first middle plate and the first back cover are arranged opposite each other. The support surface of the first housing is formed on a surface of the first middle plate facing away from the first back cover, the first side frame is connected between the first middle plate and the first back cover and is arranged around a periphery of the first middle plate, one end of the first back cover adjacent to the shaft cover extends beyond the first side frame to form a first shielding plate, and the first side frame has a first side surface facing toward the shaft cover. In an unfolded state of the support apparatus, the support surface of the first housing, the support surface of the second housing, and the support surface of the rotating shaft mechanism are coplanar and face toward a same direction, the first shielding plate is located on a side of the shaft cover facing away from the foldable screen, and the first side surface is located on a side of the shaft cover farther away from the second housing. In a folded state of the support apparatus, the first housing and the second housing are arranged opposite each other, the first shielding plate is located on a side of the shaft cover farther away from the second housing, and the first side surface is located on a side of the shaft cover facing toward the foldable screen. In this way, the first shielding plate can be used to shield part of the rotating shaft mechanism, preventing the rotating shaft mechanism from being exposed in the folded state to visually affect user experience. In addition, in the unfolded state, the first shielding plate is used to hide the hinge assembly, improving appearance consistency of the support apparatus.

To improve structural strength of the first housing, optionally, the first side frame is integrally formed with the first middle plate.

In some embodiments of the first aspect of this application, the first side surface and a surface of the first shielding plate that faces toward a same direction as the support surface of the first housing does define an avoidance surface. The first movement gap includes a first gap located between the avoidance surface and an outer peripheral surface of the shaft cover. The first flexible sealing member includes a first sealing segment, where the first sealing segment fits into and seals the first gap.

In some embodiments of the first aspect of this application, the first sealing segment includes a first body portion and a first rib segment, where the first body portion is fastened to one of the avoidance surface and the outer peripheral surface of the shaft cover, the first rib segment is fastened to the first body portion, the other one of the avoidance surface and the outer peripheral surface of the shaft cover has an arc-shaped abutting surface, a center line of the arc-shaped abutting surface is collinear with a rotation axis of the first housing, and the first rib segment abuts against the arc-shaped abutting surface. In this way, during the rotation of the first housing relative to the shaft cover, consistent pre-tightening force is applied to the first sealing segment, preventing the first sealing segment from interfering with the rotation of the first housing relative to the shaft cover.

In some embodiments of the first aspect of this application, the first sealing segment includes a first body portion, where the first body portion is fastened to one of the avoidance surface and the outer peripheral surface of the shaft cover, the first body portion is an arc-shaped sheet, a center line of the first body portion is collinear with the rotation axis of the first housing, the other one of the first housing and the shaft cover is provided with a first rib portion, and the first rib portion abuts against the first body portion. In this way, during the rotation of the first housing relative to the shaft cover, rotation of the first housing relative to the shaft cover is less obstructed by the cooperation of the first body portion and the first rib portion.

In some embodiments of the first aspect of this application, an arc-shaped surface adapted to the first body portion is formed on one of the avoidance surface and the outer peripheral surface of the shaft cover. In this way, the arc-shaped surface can be used to reliably support the first body portion to ensure an arc shape of the first body portion.

In some embodiments of the first aspect of this application, the first housing includes two first extension plates, the two first extension plates are arranged opposite each other in an extension direction of the rotation axis of the first housing, each of the first extension plates is connected to the first side surface and the first shielding plate, and the shaft cover is located between the two first extension plates. The first movement gap includes a second gap, and the second gap is formed between each of end surfaces of two ends of the shaft cover in the extension direction of the rotation axis of the first housing and each of the two first extension plates. The first flexible sealing member includes two second sealing segments, the two second sealing segments are in one-to-one correspondence with the two second gaps, and each of the second sealing segments fits into and seals the corresponding second gap.

Specifically, the second sealing segment includes a second body portion and two second rib segments. The second body portion is fastened to one of the first extension plate and the shaft cover, the second rib segment is fastened to the second body portion, and the second rib segment abuts against the other one of the first extension plate and the shaft cover. In this way, the second gap can be better sealed.

Specifically, the second sealing segment includes the second body portion. The second body portion is fastened to one of the first extension plate and the shaft cover, the other one of the first extension plate and the shaft cover is provided with a second rib portion, and the second rib portion abuts against the second body portion. In this way, the second gap can be better sealed.

Further, the second gap communicates with the first gap, and the first rib portion is connected to the second rib portion to form the rib.

Further, the second body portion is fan-shaped.

Further, the second gap communicates with the first gap, and the second body portion is connected to the first body portion to form the flexible body portion.

Further, the second gap communicates with the first gap, and the second body portion is connected to the first body portion to form the flexible body portion. In addition, the first rib segment is connected to the second rib segment to form the flexible abutting rib.

To improve the structural strength of the first housing and simplify a processing technology of the first housing, in some embodiments, the first extension plate is integrally formed with the first shielding plate. In some other embodiments, the first extension plate, the first back cover, and the first side frame may be integrally formed. In this way, any two of the first extension plate, the first back cover, and the first side frame are integrated as a whole in appearance, which helps improve appearance aesthetics of the first housing. In some other embodiments, the first middle plate, the first side frame, and the first extension plate are integrally formed.

In some embodiments of the first aspect of this application, a second movement gap is present between the second housing and the outer surface of the shaft cover; and the support apparatus further includes a second flexible sealing member, where the second flexible sealing member fits into and seals the second movement gap.

In the support apparatus in the embodiments of this application, the second flexible sealing member fits into and seals the second movement gap. Because the second flexible sealing member is compact, non-porous, soft, and deformable, the second flexible sealing member is used to seal the second movement gap to achieve waterproof and dustproof effects of the foldable electronic device, thereby preventing moisture and dust outside the foldable electronic device from entering inside of the foldable electronic device through the second movement gap, and further ensuring that the second housing moves relative to the hinge assembly without much obstruction.

In some embodiments of the first aspect of this application, the second flexible sealing member has a same structure as the first flexible sealing member.

In some embodiments of the first aspect of this application, the first flexible sealing member is a silicone member or a rubber member, which has low costs and good sealing effect.

In some embodiments of the first aspect of this application, the shaft cover has an accommodating space, and at least part of the rotating shaft mechanism is located in the accommodating space. In this way, a component of the rotating shaft mechanism can be hidden inside the shaft cover, which can improve appearance aesthetics of the support apparatus.

In some embodiments of the first aspect of this application, the rotating shaft mechanism includes a first swing arm, a first rotating shaft, a second rotating shaft, and a second swing arm. The first swing arm is configured to be fastened to the first housing. The first rotating shaft is rotatably connected to the accommodating space, and the first swing arm is fastened relative to the first rotating shaft. The second swing arm is configured to be fastened to the second housing. The second rotating shaft is rotatably connected to the accommodating space. The second rotating shaft is arranged parallel to the first rotating shaft, and the second swing arm is fastened relative to the second rotating shaft. In this way, the first housing and the second housing can rotate relative to a shaft seat, so that the support apparatus can change between the unfolded state and the folded state.

In some embodiments of the first aspect of this application, the first swing arm includes a first swing arm body and two first connecting portions. The first swing arm body is fastened and connected to the first housing. The two first connecting portions are arranged on a side of the first swing arm body closer to the shaft cover and are spaced apart along a rotation axis of the first rotating shaft. A first shaft hole is formed on each of the first connecting portions, and the first shaft hole is non-circular. The first rotating shaft is provided with a first cooperation segment, and the first cooperation segment fits into the first shaft hole. Because the first shaft hole is non-circular, and the first cooperation segment fits into the first shaft hole, limitation can be formed between the first rotating shaft and the first swing arm. In this way, when the first housing rotates, the first swing arm can rotate with the first housing, thereby driving the first rotating shaft to rotate to implement relative rotation between the first housing and the shaft cover.

Specifically, the first shaft hole is oval, and a cross section of the first cooperation segment is an oval that fits into the first shaft hole.

In some embodiments of the first aspect of this application, the second swing arm includes a second swing arm body and two second connecting portions. The second swing arm body is fastened and connected to the second housing. The two second connecting portions are arranged on a side of the second swing arm body closer to the shaft cover and are spaced apart along a rotation axis of the second rotating shaft. A second shaft hole is formed on each of the second connecting portions, and the second shaft hole is non-circular. The second rotating shaft is provided with a second cooperation segment. The second cooperation segment fits into the second shaft hole. Because the second shaft hole is non-circular, and the second cooperation segment fits into the second shaft hole, limitation can be formed between the second rotating shaft and the second swing arm. In this way, when the second housing rotates, the second swing arm may rotate with the second housing, thereby driving the second rotating shaft to rotate to implement relative rotation between the second housing and the shaft cover.

Specifically, the second shaft hole is oval, and a cross section of the second cooperation segment is an oval that fits into the second shaft hole.

In some embodiments of the first aspect of this application, the rotating shaft mechanism further includes a transmission assembly. The transmission assembly is located in the accommodating space. The transmission assembly is configured to enable the first rotating shaft and the second rotating shaft to synchronously rotate in opposite directions, thereby speeding up folding and unfolding of the support apparatus to reduce operation time of the user. Moreover, such synchronous rotation design allows the user to operate only on either of the first housing and the second housing, not necessarily on both of the first housing and the second housing, thereby simplifying the operation and improving user experience.

In some embodiments of the first aspect of this application, the transmission assembly includes a first gear, a second gear, and an intermediate gear. The first gear is fastened to the first rotating shaft and coaxially disposed with the first rotating shaft. The second gear is fastened to the second rotating shaft and coaxially disposed with the second rotating shaft. The intermediate gear is provided in an even quantity, and the even quantity of intermediate gears are sequentially arranged in arrangement directions of the first rotating shaft and the second rotating shaft and mesh with each other. The even quantity of intermediate gears are located between the first gear and the second gear. Among the even quantity of intermediate gears, an intermediate gear closest to the first gear meshes with the first gear, and an intermediate gear closest to the second gear meshes with the second gear. In this way, the first gear and the second gear can synchronously rotate in opposite directions, so that the first housing and the second housing synchronously rotate in opposite directions, enabling the support apparatus to change between the folded state and the unfolded state at a higher speed.

In some embodiments of the first aspect of this application, part of a surface of the first middle plate facing away from the first back cover is recessed in a direction toward the first back cover to form a first groove. The first groove extends to an edge of the first middle plate in a direction approaching the shaft cover. Part of the first swing arm is located in the first groove. Such arrangement helps ensure that the support surface of the first housing and a support surface of the first swing arm are coplanar, thereby preventing a problem that the foldable screen is not flat caused by the support surface of the first swing arm protruding out of the support surface of the first housing due to absence of the first groove. This helps ensure reliable support for the foldable screen, thereby ensuring flatness of the foldable screen.

According to a second aspect, this application provides a foldable electronic device. The foldable electronic device includes a support apparatus and a foldable screen. The support apparatus is the support apparatus according to any one of the foregoing embodiments. The foldable screen includes a first part, a second part, and a third part, where the third part is connected between the first part and the second part, the first part provides support on and is fastened to a support surface of a first housing, the second part provides support on and is fastened to a support surface of a second housing, and the third part provides support on a support surface of a rotating shaft mechanism.

In the foldable electronic device of the embodiments of this application, the support apparatus is disposed, and in the support apparatus, the first flexible sealing member fits into and seals the first movement gap. Because the first flexible sealing member is compact, non-porous, soft, and deformable, the first flexible sealing member is used to seal the first movement gap to achieve waterproof and dustproof effects of the foldable electronic device, thereby preventing moisture and dust outside the foldable electronic device from entering inside of the foldable electronic device through the first movement gap, and further ensuring that the first housing moves relative to the hinge assembly without much obstruction

Figure 1:
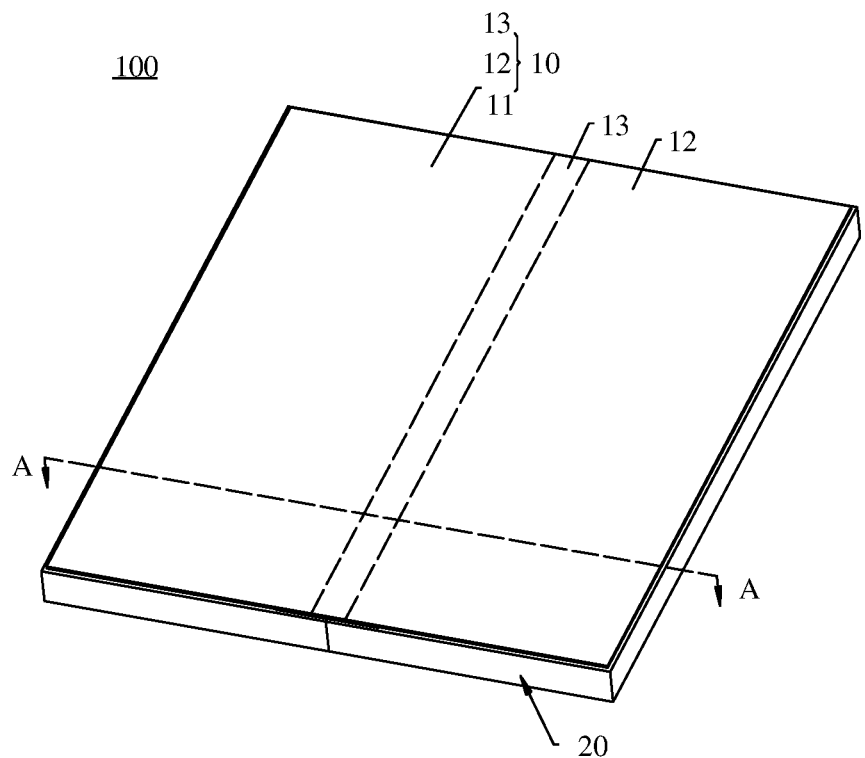
FIG. 1 is a three-dimensional diagram of a foldable electronic device in an unfolded state according to a first embodiment of this application.

REFERENCE SIGNS 100. foldable electronic device; 10. foldable screen; 11. first part; 12. second part; 13. third part;

20. support apparatus; 21. first housing; 211. first middle plate; 211a. first groove; 212. first back cover; 2121. first shielding plate; 213. first side frame; 2131. first side surface; 214. first extension plate; 22. second housing; 23. hinge assembly; 24. shaft cover; 241. bottom plate; 242. side plate; 2421. first side plate; 2422. second side plate; 2423. first end plate; 2424.

second end plate; 24a. accommodating space; 243. rib; 2431. first rib portion; 2432. second rib portion; 25. rotating shaft mechanism; 251. first swing arm; 2511. first swing arm body; 2512. first connecting portion; 2512a. first shaft hole; 252. first rotating shaft; 2521. first cooperation segment; 253. second rotating shaft; 2531. second cooperation segment; 254. second swing arm; 2541. second swing arm body; 2542. second connecting portion; 2542a. second shaft hole; 255. transmission assembly; 2551. first gear; 2552. second gear 2553. intermediate gear; 256. first flexible sealing member; 2561. first sealing segment; 2562. second sealing segment; 256a. flexible body portion; 256a1. first body portion; 256a2. second body portion; 256a3. protruding portion; 256b. flexible abutting rib; 256b1. first rib segment; 256b2. second rib segment; 257. embedded groove; 2571. first groove segment; 2572. second groove segment; 2573. retaining groove; 258. second flexible sealing member;

G. first movement gap; G1. first gap; G2. second gap; and
H. second movement gap.

DETAILED DESCRIPTION OF ILLUSTRATIVE EMBODIMENTS

In the embodiments of this application, the terms "first" and "second" are merely intended for a purpose of description, and shall not be understood as an indication or implication of relative importance or an implicit indication of a quantity of the indicated technical features. Therefore, a feature limited by "first" or "second" may explicitly or implicitly include one or more features.

In the descriptions of the embodiments of this application, it should be noted that unless otherwise specified and defined explicitly, the terms "mount", "connect", and "join" should be understood in their general senses. For example, "join" may refer to a detachable connection or a non-detachable connection; or may refer to a direct connection or an indirect connection via an intermediate medium. "Fixedly connected" means being connected to each other and a relative position relationship after connection remaining unchanged. "Rotatably connected" means being connected to each other and capable of rotating relative to each other after connection. "Slidably connected" means being connected to each other and capable of sliding relative to each other after connection.

Orientation terms such as "inside", "outside" mentioned in the embodiments of this application merely refer to directions of the accompanying drawings. Therefore, the orientation terms are used for better and clearer description and understanding of the embodiments of this application, rather than indicating or implying that an apparatus or a component must have a particular orientation or must be constructed and operated in a particular orientation, and therefore shall not be construed as limitations on this application. In addition, unless otherwise specified, "a plurality of" described in this application means two or more.

In the descriptions of the embodiments of this application, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

In the embodiments of this application, the term "and/or" describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects. The terms "parallel", "coplanar", and "collinear" described in the specification allow for a specific error range. For example, A and B being parallel means that an included angle between A and B is equal to or less than 15°, and specifically, may be equal to or less than 10°, 8° or 5°. For example, A and B being coplanar means that an included angle between A and B is between 170° and 190°. For example, A and B being collinear means that a distance between A and B is equal to or less than 5 mm, 3 mm, 2 mm, 1 mm, or 0.5 mm.

An embodiment of this application provides a foldable electronic device. The foldable electronic device may be any electronic device having a foldable screen and capable of changing the foldable screen and the electronic device itself to an unfolded or folded mode. According to different usage requirements, the foldable electronic device may be unfolded to an unfolded state, may be folded to a folded state, or may be in an intermediate state between the unfolded state and the folded state. In other words, the foldable electronic device has at least two states: the unfolded state and the folded state. In some cases, the foldable electronic device may further include a third state: the intermediate state between the unfolded state and the folded state. It can be understood that the intermediate state is not only one state, but may be any one or more states of the foldable electronic device between the unfolded state and the folded state.

Specifically, the foldable electronic device includes, but is not limited to, a mobile phone, a tablet personal computer (tablet personal computer), and the like.

Referring to FIG. 1, FIG. 1 is a three-dimensional diagram of a foldable electronic device 100 in an unfolded state according to a first embodiment of this application. In this embodiment, the foldable electronic device 100 is a foldable phone. The foldable electronic device 100 includes a foldable screen 10 and a support apparatus 20.

It can be understood that FIG. 1 merely shows an example of some components included in the foldable electronic device 100. Actual shapes, actual sizes, actual positions, and actual structures of these components are not limited by FIG. 1.

The foldable screen 10 can be configured to display information and provide an interactive interface for a user. In the embodiments of this application, the foldable screen 10 may be, but is not limited to, an organic light-emitting diode (organic light-emitting diode, OLED) display, an active-matrix organic light-emitting diode (active-matrix organic light-emitting diode, AMOLED) display, a mini organic light-emitting diode (mini organic light-emitting diode) display, a micro light-emitting diode (micro organic light-emitting diode) display, a micro organic light-emitting diode (micro organic light-emitting diode) display, a quantum dot light emitting diode (quantum dot light emitting diode, QLED) display, and the like.

The foldable screen 10 can change between an unfolded state and a folded state. Specifically, still referring to FIG. 1, the foldable screen 10 may include a first part 11, a second part 12, and a third part 13. The third part 13 is connected between the first part 11 and the second part 12. At least the third part 13 of the foldable screen 10 is made of a flexible material. The first part 11 and the second part 12 may be made of a flexible material, may be made of a rigid material, or may be partially made of a rigid material and partially made of a flexible material, which is not specifically limited herein.

Still referring to FIG. 1, when the foldable screen 10 is in the unfolded state, the first part 11, the second part 12, and the third part 13 are coplanar and have a same orientation. In this state, the foldable screen 10 supports large-screen display, which can provide more information for a user and enhance user experience.

Figure 2:
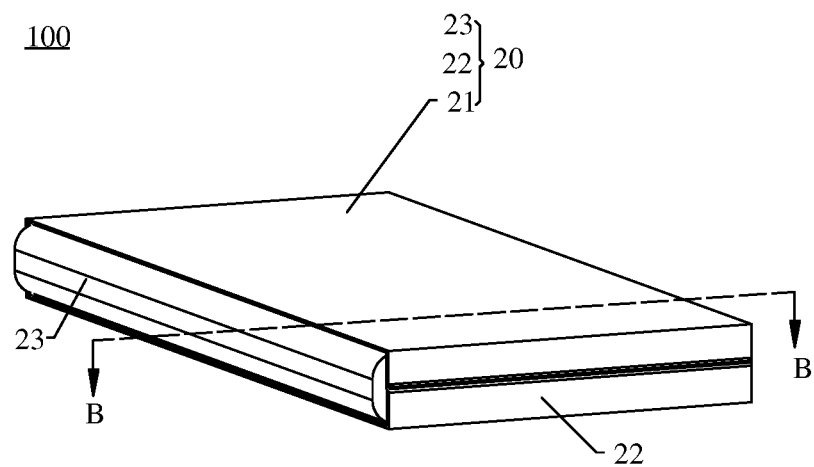
FIG. 2 is a three-dimensional diagram of the foldable electronic device shown in FIG. 1 when in a folded state.

Referring to FIG. 2, FIG. 2 is a three-dimensional diagram of the foldable electronic device 100 shown in FIG. 1 when in a folded state. When the foldable screen 10 is in the folded state, the third part 13 is in a bent state, and the first part 11 (not shown in FIG. 2) is opposite the second part 12 (not shown in FIG. 2). In this state, the foldable screen 10 is invisible to the user, and the support apparatus 20 provides protection outside the foldable screen 10 to prevent the foldable screen 10 from being scratched by a hard object. In addition, in this state, a volume of the foldable electronic device 100 can be reduced, allowing the foldable electronic device 100 to be easily accommodated.

Figure 3:
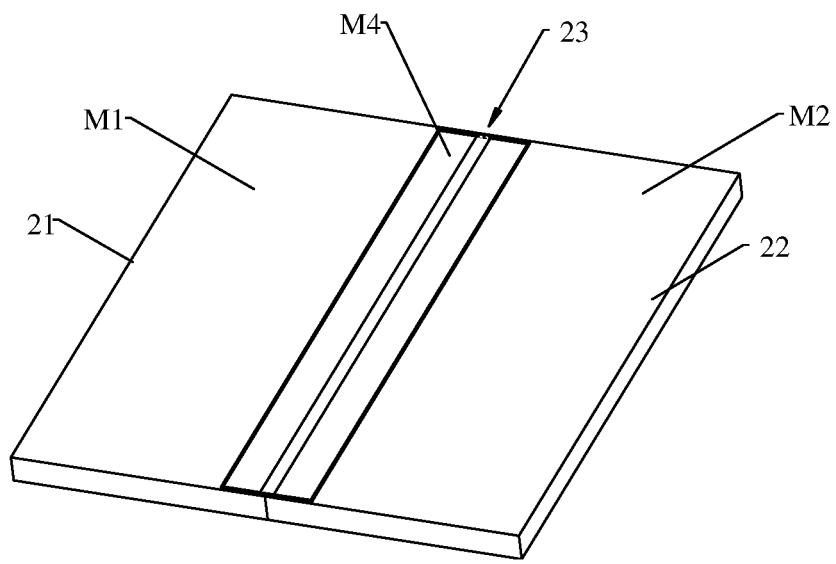
FIG. 3 is a three-dimensional diagram of a support apparatus of the foldable electronic device shown in FIG. 1.

The support apparatus 20 is configured to support the foldable screen 10 and allows the foldable screen 10 to change between the unfolded state and the folded state. Referring to FIG. 3, FIG. 3 is a three-dimensional diagram of the support apparatus 20 of the foldable electronic device 100 shown in FIG. 1. In this embodiment, the support apparatus 20 includes a first housing 21, a second housing 22, and a hinge assembly 23.

It can be understood that FIG. 3 merely shows an example of some components included in the support apparatus 20. Actual shapes, actual sizes, actual positions, and actual structures of these components are not limited by FIG. 3.

The first housing 21 has a support surface M1. The first housing 21 fixes and supports the first part 11 of the foldable screen 10 in FIG. 1 through the support surface M1. For example, the support surface M1 is connected to the first part 11 by, without limitation to, gluing. The second housing 22 has a support surface M2. The second housing 22 fixes and supports the second part 12 of the foldable screen 10 in FIG. 1 through the support surface M2. For example, the support surface M2 is connected to the second part 12 by, without limitation to, gluing.

The hinge assembly 23 has a support surface M4. The hinge assembly 23 supports the third part 13 of the foldable screen 10 through the support surface M4. The hinge assembly 23 is connected between the first housing 21 and the second housing 22, and the first housing 21 and the second housing 22 are rotatably connected through the hinge assembly 23 to implement relative folding or relative unfolding of the first housing 21 and the second housing 22.

Specifically, still referring to FIG. 3, in the unfolded state, the support surface M1 of the first housing 21, the support surface M2 of the second housing, and the support surface M4 of the hinge assembly 23 are coplanar and have a same orientation, thereby supporting the foldable screen 10 reliably and ensuring flatness of the foldable screen 10. In the folded state, the first housing 21 is opposite the second housing 22 (with reference to FIG. 2) to hide the foldable screen 10 between the first housing 21 and the second housing 22, thereby protecting the foldable screen 10.

The foldable electronic device 100 provided in the embodiments of this application can change between the unfolded state and the folded state. When a user uses the foldable electronic device 100 to perform an operation such as browsing web pages and information, watching videos, and playing games, the foldable electronic device 100 may be changed from the folded state to the unfolded state. Specifically, the first housing 21 and the second housing 22 may be respectively rotated 90° in directions facing away from each other, so that an included angle between the first housing 21 and the second housing 22 is 180°. In this way, the foldable electronic device 100 supports large-screen display, which can provide more information for the user and enhance user experience.

The user can change the foldable electronic device 100 from the unfolded state to the folded state after using the foldable electronic device 100. Specifically, the first housing 21 and the second housing 22 may be respectively rotated 90° toward directions approaching each other, so that an included angle between the first housing 21 and the second housing 22 is 0°. In this way, a volume of the foldable electronic device 100 can be reduced, allowing the foldable electronic device 100 to be easily accommodated. In the folded state, the foldable screen 10 is invisible to the user, and the foldable screen 10 can be protected against scratches by a hard object.

Figure 4:
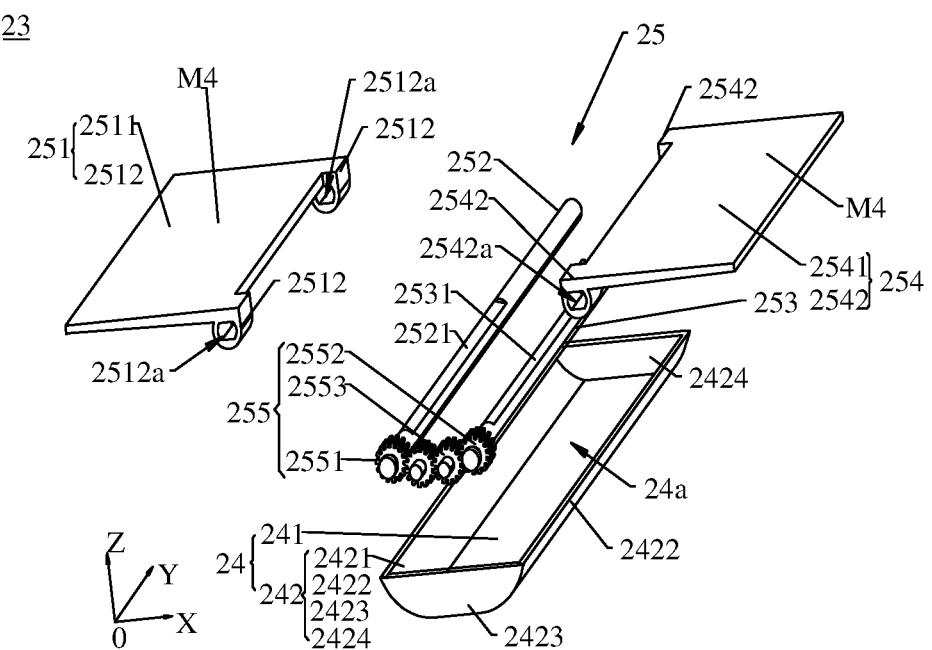
FIG. 4 is an exploded view of a hinge assembly of the support apparatus shown in FIG. 3.

Referring to FIG. 4, FIG. 4 is an exploded view of the hinge assembly 23 of the support apparatus 20 shown in FIG. 3. In this embodiment, the hinge assembly 23 includes a shaft cover 24 and a rotating shaft mechanism 25.

It can be understood that FIG. 4 merely shows an example of some components included in the hinge assembly 23. Actual shapes, actual sizes, actual positions, and actual structures of these components are not limited by FIG. 4.

To facilitate descriptions of the following embodiments, an XYZ coordinate system is established for the shaft cover 24. Specifically, a thickness direction of the shaft cover 24 is defined as a Z-axis direction, a length direction of the shaft cover 24 is defined as a Y-axis direction, and a direction perpendicular to both the Y-axis direction and the Z-axis direction is an X-axis direction. It can be understood that the coordinate system can be flexibly set based on actual needs, which is not specifically limited herein.

The shaft cover 24 is configured to keep the rotating shaft mechanism 25 in place. Still referring to FIG. 4, the shaft cover 24 includes a bottom plate 241 and side plate 242. The bottom plate 241 extends in the Y-axis direction. For example, the bottom plate 241 is made into a substantially rectangular plate-like structure. The side plate 242 surrounds a periphery of the bottom plate 241, and the side plate 242 and the bottom plate 241 define an accommodating space 24a. At least part of a structure of the rotating shaft mechanism 25 may be accommodated in the accommodating space 24a. In this way, a component of the rotating shaft mechanism 25 can be hidden inside the shaft cover 24, which can improve appearance aesthetics of the foldable electronic device 100.

Specifically, still referring to FIG. 4, the side plate 242 includes a first side plate 2421, a second side plate 2422, a first end plate 2423, and a second end plate 2424. The first side plate 2421, the first end plate 2423, the second side plate 2422, and the second end plate 2424 are connected end to end in sequence. Specifically, both the first side plate 2421 and the second side plate 2422 extend in the Y-axis direction, and the first side plate 2421 and the second side plate 2422 are located on two sides of the bottom plate 241 in the X-axis direction. For example, the first side plate 2421 and the second side plate 2422 are both in an arc shape. A center line of the first side plate 2421 extends in the Y-axis direction, and a center line of the second side plate 2422 extends in the Y-axis direction. This helps reduce space occupied by the shaft cover 24 and improve appearance aesthetics of the shaft cover 24. In addition, this helps the first housing 21 rotate relative to the shaft cover 24 and the second housing 22 rotate relative to the shaft cover 24. Certainly, it can be understood that in other examples, the first side plate 2421 and the second side plate 2422 may alternatively be in a flat plate shape.

The first end plate 2423 and the second end plate 2423 are arranged opposite each other in the Y-axis direction. The first end plate 2423 and the second end plate 2423 are both in a flat plate shape. For example, to adapt to the arc shapes of the first side plate 2421 and the second side plate 2422, the first end plate 2423 and the second end plate 2423 are small-semicircular flat plates.

It should be noted that a center line of component A described in the specification is a center axis of a cylinder in which component A is located.

The rotating shaft mechanism 25 may be provided in a quantity of one, two, or more. FIG. 4 merely shows an example in which there is only one rotating shaft mechanism 25, but this shall not be considered as a special limitation on this application.

Still referring to FIG. 4, the rotating shaft mechanism 25 has the support surface M4. Specifically, the rotating shaft mechanism 25 includes a first swing arm 251, a first rotating shaft 252, a second rotating shaft 253, a second swing arm 254, and a transmission assembly 255.

The first swing arm 251 has the support surface M4. The support surface M4 on the first swing arm 251 is used to fix and support part of the third part 13. For example, the support surface M4 on the first swing arm 251 may be connected to the third part 13 by gluing.

The first swing arm 251 is configured to be fastened to the first housing 21. The first swing arm 251 may be fastened and connected to the first housing 21 by bonding, clamping, welding, screwing, or the like. For example, a surface of the first swing arm 251 facing away from the support surface M4 is fastened to the first housing 21 by gluing.

Specifically, still referring to FIG. 4, the first swing arm 251 includes a first swing arm body 2511 and two first connecting portions 2512. The first swing arm body 2511 is in a rectangular plate shape. A length direction of the first swing arm body 2511 is parallel to the Y-axis direction. The first swing arm 251 is fastened and connected to the first housing 21 by using the first swing arm body 2511.

Still referring to FIG. 4, the two first connecting portions 2512 are disposed on a side of the first swing arm body 2511 closer to the shaft cover 24. The two first connecting portions 2512 are spaced apart in a length direction of the first swing arm 251. The two first connecting portions 2512 are connected to the first swing arm body 2511 to form an integral structure. A first shaft hole 2512a is formed on each of the first connecting portions 2512, and the first shaft hole 2512a is non-circular. For example, the first shaft hole 2512a is oval, triangular, or trapezoidal.

The first rotating shaft 252 is located in the accommodating space 24a. The first rotating shaft 252 is rotatably connected to the shaft cover 24, and a rotation axis of the first rotating shaft 252 extends in the Y-axis direction. The first rotating shaft 252 is provided with a first cooperation segment 2521. The first cooperation segment 2521 fits the first shaft hole 2512a. Because the first shaft hole 2512a is non-circular, and the first cooperation segment 2521 fits into the first shaft hole 2512a, a limitation can be formed between the first rotating shaft 252 and the first swing arm 251. In this way, when the first housing 21 rotates, the first swing arm 251 can rotate with the first housing 21, thereby driving the first rotating shaft 252 to rotate to implement relative rotation between the first housing 21 and the shaft cover 24. It can be understood that a rotation axis of the first housing 21 is the rotation axis of the first rotating shaft 252.

The second swing arm 254 is spaced apart from the first swing arm 251 in the x-axis direction. The second swing arm 254 has the support surface M4. The support surface M4 on the second swing arm 254 is used to fix and support part of the third part 13. For example, the support surface M4 on the second swing arm 254 may be connected to the third part 13 by gluing.

The second swing arm 254 is configured to be fastened to the second housing 22. The second swing arm 254 may be fastened and connected to the second housing 22 by bonding, clamping, welding, screwing, or the like. For example, a surface of the second swing arm 254 facing away from the support surface M4 is fastened to the second housing 22 by gluing.

Specifically, the second swing arm 254 includes a second swing arm body 2541 and two second connecting portions 2542. The second swing arm body 2541 is in a rectangular plate shape. A length direction of the second swing arm body 2541 is parallel to the Y-axis direction. The second swing arm 254 is fastened and connected to the second housing 22 by using the second swing arm body 2541.

Still referring to FIG. 4, the two second connecting portions 2542 are disposed on a side of the second swing arm body 2541 closer to the shaft cover 24. The two second connecting portions 2542 are spaced apart in a length direction of the second swing arm 254. The two second connecting portions 2542 are connected to the second swing arm body 2541 to form an integral structure. A second shaft hole 2542a is formed on each of the second connecting portions 2542, and the second shaft hole 2542a is non-circular. For example, the second shaft hole 2542a is oval, triangular, or trapezoidal.

The second rotating shaft 253 is located in the accommodating space 24a. The second rotating shaft 253 is parallel to the first rotating shaft 252 and spaced apart from the first rotating shaft 252 in the X-axis direction. The second rotating shaft 253 is rotatably connected to the shaft cover 24, and a rotation axis of the second rotating shaft 253 extends in the Y-axis direction. The second rotating shaft 253 is provided with a second cooperation segment 2531. The second cooperation segment 2531 fits into the second shaft hole 2542a. Because the second shaft hole 2542a is non-circular, and the second cooperation segment 2531 fits into the second shaft hole 2542a, a limitation can be formed between the second rotating shaft 253 and the second swing arm 254. In this way, when the second housing 22 rotates, the second swing arm 254 can rotate with the second housing 22, thereby driving the second rotating shaft 253 to rotate to implement relative rotation between the second housing 22 and the shaft cover 24.

The transmission assembly 255 is located in the accommodating space 24a. The transmission assembly 255 is configured to enable the first rotating shaft 252 and the second rotating shaft 253 to synchronously rotate in opposite directions. That means the transmission assembly 255 can correlate the rotations of the first rotating shaft 252 and the second rotating shaft 253, thereby correlating the rotations of the first housing 21 and the second housing 22. Specifically, the first housing 21 and the second housing 22 may synchronously rotate in opposite directions, that is, when the first housing 21 rotates, the second housing 22 rotates relative to the first housing 21 in an opposite direction. Such synchronous rotation design can speed up folding and unfolding of the foldable electronic device 100 to reduce operation time of the user. Moreover, such synchronous rotation design allows the user to operate only on either of the first housing 21 and the second housing 22, not necessarily on both of the first housing 21 and the second housing 22, thereby simplifying the operation and improving user experience.

The first housing 21 and the second housing 22 that rotate in opposite directions may include two states. A first state is that when the foldable electronic device 100 is folded, the first housing 21 and the second housing 22 rotate toward (or relative to) each other. A second state is that when the foldable electronic device 100 is unfolded, the first housing 21 and the second housing 22 rotate facing away from each other.

Still referring to FIG. 4, the transmission assembly 255 includes a first gear 2551, a second gear 2552, and an intermediate gear 2553. The first gear 2551 is fastened to the first rotating shaft 252 and coaxially disposed with the first rotating shaft 252. For example, the first gear 2551 may be integrally formed with the first rotating shaft 252 by milling by a computer numerical control (computer numerical control, CNC) milling machine. In this way, structural accuracy of the first rotating shaft 252 and the first gear 2551 can be improved, and connection strength between the first gear 2551 and the first rotating shaft 252 can be improved, thereby simplifying an assembly process of the rotating shaft mechanism 25 to reduce an assembly error of the rotating shaft mechanism 25.

The second gear 2552 is fastened to the second rotating shaft 253 and coaxially disposed with the second rotating shaft 253. For example, the second gear 2552 may be integrally formed with the second rotating shaft 253 by milling by a computer numerical control (computer numerical control, CNC) milling machine. In this way, structural accuracy of the second rotating shaft 253 and the second gear 2552 can be improved, and connection strength between the second gear 2552 and the second rotating shaft 253 can be improved, thereby simplifying an assembly process of the rotating shaft mechanism 25 to reduce an assembly error of the rotating shaft mechanism 25.

The intermediate gears 2553 is provided in a quantity of two, and the two intermediate gears 2553 mesh with each other. One of the intermediate gears 2553 meshes with the first gear 2551, and the other intermediate gear 2553 meshes with the second gear 2552. The intermediate gears 2553, the first gear 2551, and the second gear 2552 have the same diameter and teeth count. In this way, the two intermediate gears 2553 are disposed to mesh with the first gear 2551 and the second gear 2552, so that the first gear 2551 and the second gear 2552 can synchronously rotate in opposite directions, that is, the first rotating shaft 252 and the second rotating shaft 253 can synchronously rotate in opposite directions. Therefore, when the user applies a force to one of the first housing 21 and the second housing 22, the first housing 21 and the second housing 22 can synchronously rotate in opposite directions, so that the foldable electronic device 100 can change between the folded state and the unfolded state, thereby increasing a change speed.

It should be noted that a quantity of intermediate gears 2553 is not limited to 2, as long as the intermediate gear 2553 is provided in an even quantity. For example, the quantity of intermediate gears 2553 is 4, 6, or 8. Certainly, the intermediate gear 2553 may alternatively not be disposed in the transmission assembly 255, but the first gear 2551 directly meshes with the second gear 2552.

Figure 5:
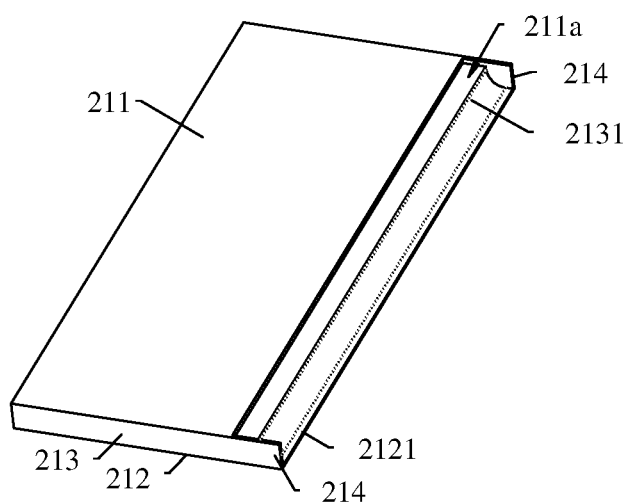
FIG. 5 is a three-dimensional diagram of a first housing of the support apparatus shown in FIG. 3.

Referring to FIG. 5, FIG. 5 is a three-dimensional diagram of the first housing 21 of the support apparatus 20 shown in FIG. 3. The first housing 21 includes a first middle plate 211, a first back cover 212, and a first side frame 213.

The first middle plate 211 is in a rectangular flat plate shape. The first middle plate 211 and the first back cover 212 are arranged opposite each other. Specifically, part of a surface of the first middle plate 211 facing away from the first back cover 212 is recessed in a direction toward the first back cover 212 to form a first groove 211a. The first groove 211a extends to an edge of the first middle plate 211 in a direction approaching the shaft cover 24. Part of the first swing arm body 2511 is located in the first groove 211a (with reference to FIG. 3). Such arrangement helps ensure that the support surface M1 of the first housing 21 and the support surface M4 of the first swing arm body 2511 are coplanar, thereby preventing a problem that the foldable screen 10 is not flat caused by the support surface M4 of the first swing arm body 2511 protruding out of the support surface M1 of the first housing 21 due to absence of the first groove 211a. This helps ensure reliable support for the foldable screen 10, thereby ensuring flatness of the foldable screen 10. The remaining part of the surface of the first middle plate 211 facing away from the first back cover 212 forms the support surface M1 of the first housing 21.

The first side frame 213 is connected to the first middle plate 211 and the first back cover 212, and the first side frame 213 is arranged around a periphery of the first middle plate 211. In this way, the first side frame 213, the first middle plate 211, and the first back cover 212 can enclose a mounting space for mounting an electronic component of the foldable electronic device 100, such as a circuit board, a battery, a receiver, a speaker, and a camera. Electronic components of the foldable electronic device 100, such as a main controller, a storage unit, an antenna module, and a power management module, may be integrated on the circuit board, and the battery may supply power to the electronic components, such as the foldable screen 10, the circuit board, the receiver, the speaker, and the camera.

To improve structural strength of the first housing 21, optionally, the first side frame 213 is integrally formed with the first middle plate 211. Certainly, this application is not limited thereto, and in other examples, the first side frame 213 and the first middle plate 211 may also be connected through clamping, gluing, or welding.

One end of the first back cover 212 adjacent to the shaft cover 24 extends beyond the first side frame 213 to form a first shielding plate 2121, and the first side frame 213 has a first side surface 2131 adjacent to the shaft cover 24. The first side surface 2131 and a surface of the first shielding plate 2121 that faces toward a same direction as the support surface M1 of the first housing 21 does define an avoidance surface. To be specific, the first side surface 2131 and a surface of the first shielding plate 2121 that faces toward the foldable screen 10 can define an avoidance surface. For example, the first side surface 2131 transitions, through an arc-shaped surface, to the surface of the first shielding plate 2121 that faces toward a same direction as the support surface M1 of the first housing 21 does. For example, the avoidance surface is an arc-shaped surface, and a center line of the avoidance surface extends in the Y-axis direction. Certainly, it can be understood that in other examples, the first side surface 2131 and the surface of the first shielding plate 2121 that faces toward the foldable screen 10 are both flat surfaces, with an included angle therebetween. For example, the two surfaces are vertically arranged.

Further, still referring to FIG. 5, the first housing 21 further includes two first extension plates 214. The two first extension plates 214 are arranged opposite each other in the Y-axis direction. The two first extension plates 214 are respectively disposed on two ends of the first side surface 2131, and each of the first extension plates 214 is connected to the first shielding plate 2121. In this way, the first shielding plate 2121 and the two first extension plates 214 may form a U-shaped plate. Certainly, it can be understood that, in other examples, the first housing 21 may alternatively not include two first extension plates 214. Alternatively, in other examples, the first housing 21 does not include the first shielding plate 2121, but includes two first extension plates 214.

To improve the structural strength of the first housing 21 and simplify a processing technology of the first housing 21, in some embodiments, the first extension plate 214 may be integrally formed with the first shielding plate 2121. For example, the first extension plate 214 and the first back cover 212 provided with the first shielding plate 2121 may be integrally formed. In other words, after being integrally formed, the first extension plate 214 and the first back cover 212 are connected to the first side frame 213 through another assembly process such as welding and bonding. In some other embodiments, the first extension plate 214, the first back cover 212, and the first side frame 213 may be integrally formed. In this way, any two of the first extension plate 214, the first back cover 212, and the first side frame 213 are integrated as a whole in appearance, which helps improve appearance aesthetics of the first housing 21. In some other embodiments, the first middle plate 211, the first side frame 213, and the first extension plate 214 are integrally formed.

Figure 6:
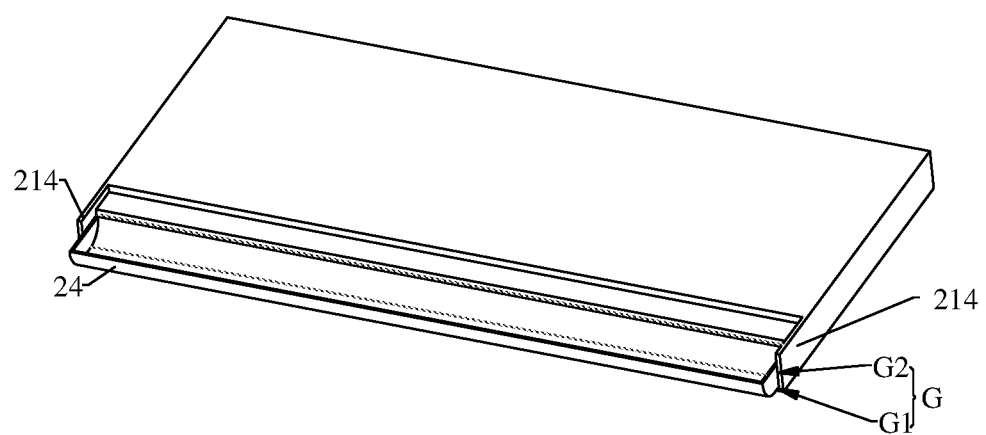
FIG. 6 is a schematic diagram of cooperation between the first housing of the support apparatus shown in FIG. 3 and a shaft cover.
Figure 7:
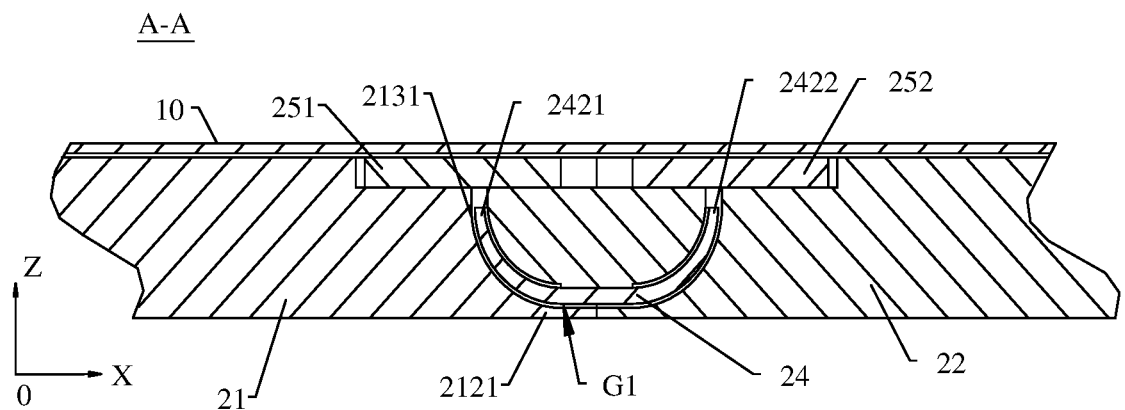
FIG. 7 is a schematic partial cross-sectional view of the foldable electronic device shown in FIG. 1 along a line A-A.

Referring to FIG. 6, FIG. 6 is a schematic diagram of cooperation between the first housing 21 of the support apparatus 20 shown in FIG. 3 and the shaft cover 24. The shaft cover 24 is located between the two first extension plates 214. Specifically, referring to FIG. 7, FIG. 7 is a schematic partial cross-sectional view of the foldable electronic device 100 shown in FIG. 1 along a line A-A. Being along the line "A-A" means being along the line A-A and a plane enclosed as indicated by arrows at two ends of the line A-A. The same description hereinafter should be understood in the same way. In the unfolded state, the first shielding plate 2121 is located on a side of the shaft cover 24 facing away from the foldable screen 10, and the first side surface 2131 is located on a side of the shaft cover 24 farther away from the second housing 22, that is, the first side surface 2131 and the first side plate 2421 are opposite each other in the x-axis direction. In this way, in the unfolded state, the first shielding plate 2121 is used to hide the hinge assembly 23 to improve appearance consistency of the support apparatus 20.

Figure 8:
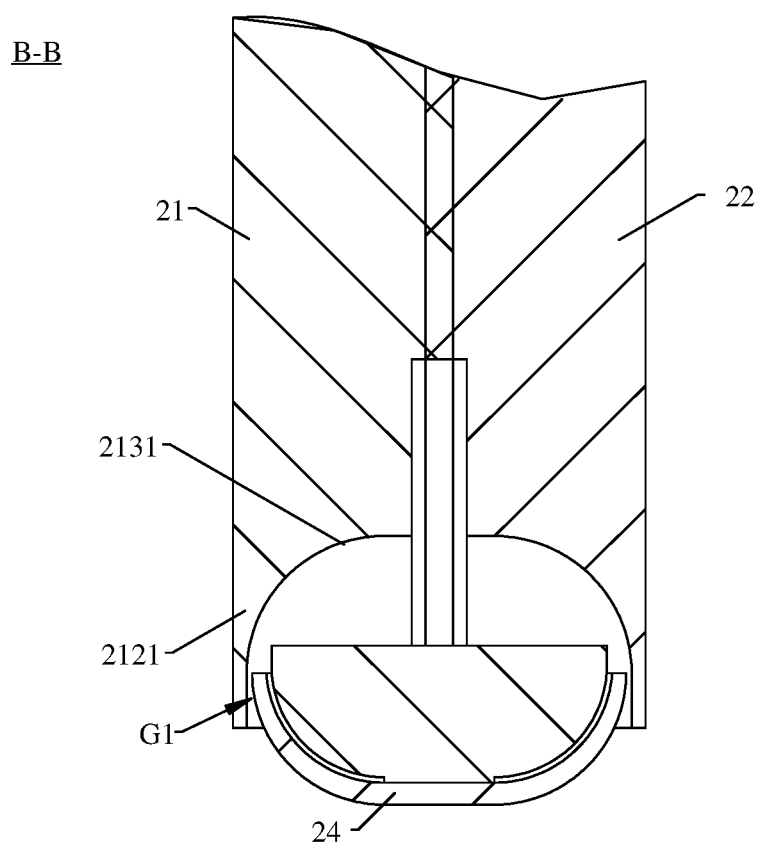
FIG. 8 is a schematic partial cross-sectional view of the foldable electronic device shown in FIG. 2 along a line B-B.

Referring to FIG. 8, FIG. 8 is a schematic partial cross-sectional view of the foldable electronic device 100 shown in FIG. 2 along a line B-B. In the folded state, the first shielding plate 2121 is located on a side of the shaft cover 24 farther away from the second housing 22, that is, the first shielding plate 2121 is located on a side that the first side plate 2421 faces toward, and the first side surface 2131 is located on a side of the shaft cover 24 facing toward the foldable screen 10. In this way, the first shielding plate 2121 can be used to shield part of the rotating shaft mechanism 25, preventing the rotating shaft mechanism 25 from being exposed in the folded state to visually affect user experience.

Certainly, it can be understood that, in other examples, the first back cover 212 may alternatively not be provided with the first shielding plate 2121. In this case, the first back cover 212 has a same size as the first middle plate 211, and the first side frame 213 is arranged around a periphery of the first back cover 212.

The second housing 22 has a same structure as the first housing 21. A cooperation relationship between the second housing 22 and the shaft cover 24 is the same as a cooperation relationship between the first housing 21 and the shaft cover 24. A cooperation relationship between the second housing 22 and the second swing arm 254 is the same as a cooperation relationship between the first housing 21 and the first swing arm 251. Details are not further described herein.

Still referring to FIG. 6 to FIG. 8, to ensure that the first housing 21 rotates relative to the shaft cover 24 without interference, a first gap G1 is reserved between the avoidance surface and an outer peripheral surface of the shaft cover 24. A second gap G2 is reserved between each of the two first extension plates 214 and an end of the shaft cover 24. The first gap G1 communicates with the second gap G2, thereby forming a first movement gap G between the first housing 21 and the shaft cover 24. However, the first movement gap G compromises waterproof and dustproof effects of the foldable electronic device 100.

Figure 9:
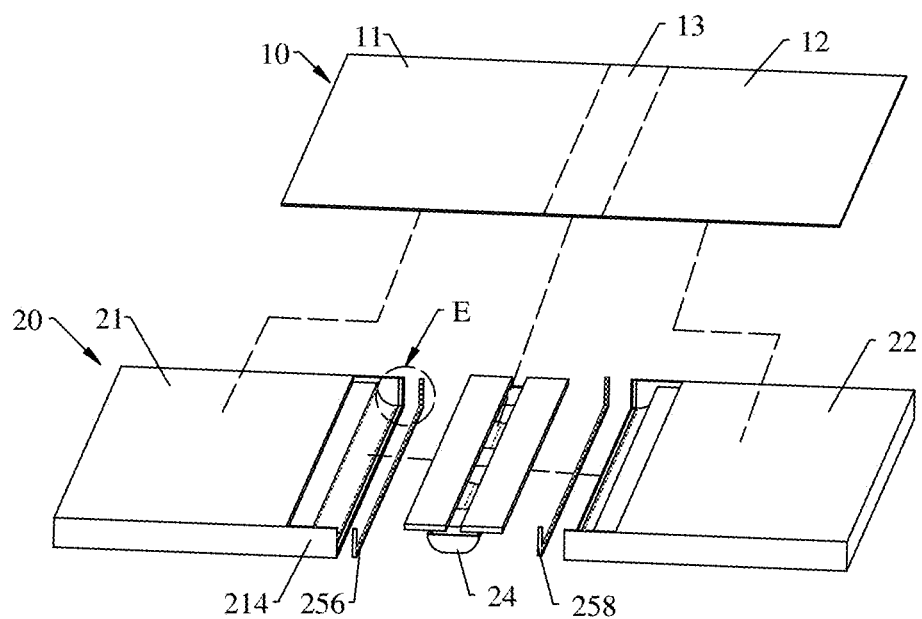
FIG. 9 is an exploded view of a foldable electronic device according to a second embodiment of this application.
Figure 10:
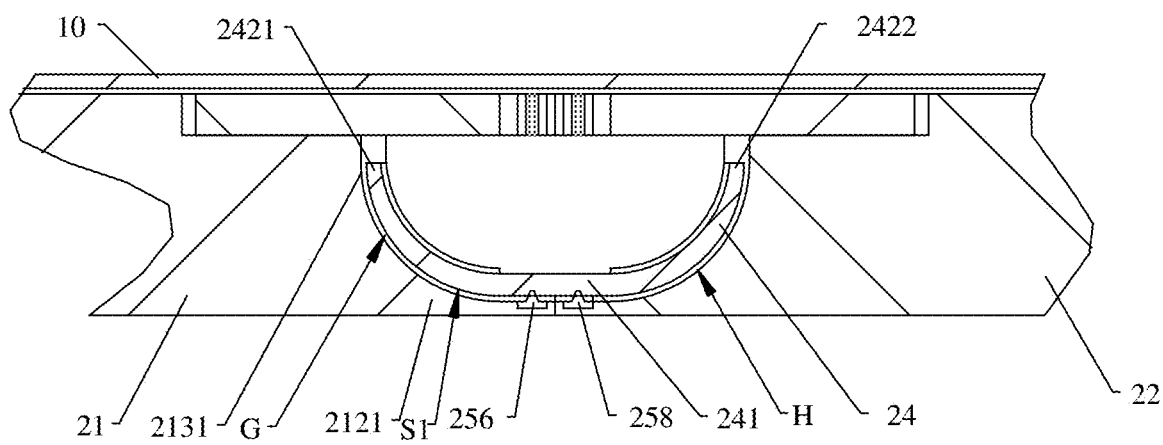
FIG. 10 is a schematic partial cross-sectional view of the foldable electronic device shown in FIG. 9 when in an unfolded state.
Figure 11:
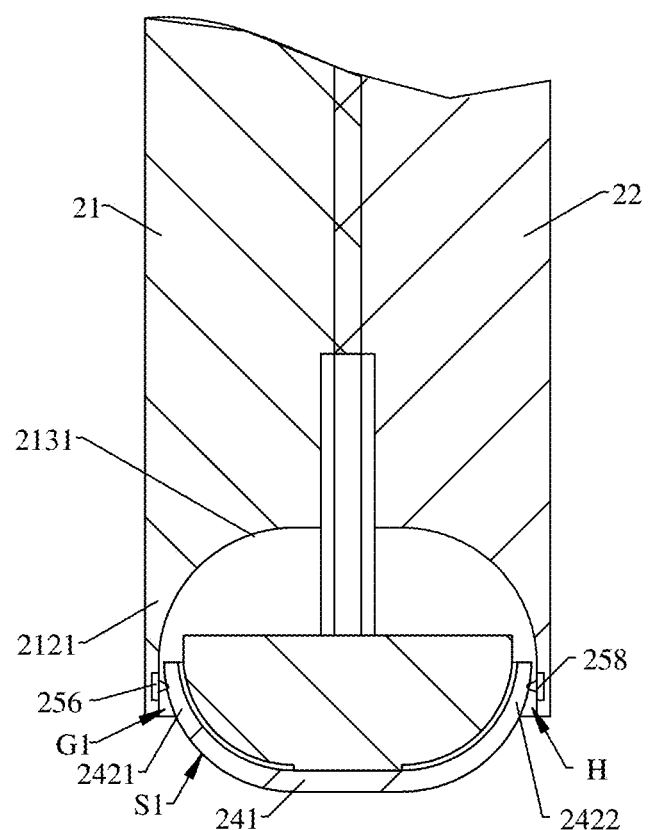
FIG. 11 is a schematic partial cross-sectional view of the foldable electronic device shown in FIG. 9 when in a folded state.

To resolve the technical problem, refer to FIG. 9. FIG. 10, and FIG. 11. FIG. 9 is an exploded view of a foldable electronic device 100 according to a second embodiment of this application; FIG. 10 is a schematic partial cross-sectional view of the foldable electronic device 100 shown in FIG. 9 when in an unfolded state; and FIG. 11 is a schematic partial cross-sectional view of the foldable electronic device 100 shown in FIG. 9 when in a folded state. The support apparatus 20 further includes a first flexible sealing member 256. The first flexible sealing member 256 fits into and seals the first movement gap G. That is, the first flexible sealing member 256 is located in the first movement gap G, and the first flexible sealing member 256 serves as a seal between the first housing 21 and the shaft cover 24. Because the first flexible sealing member 256 is compact, non-porous, soft, and deformable, the first flexible sealing member 256 is used to seal the first movement gap G to achieve waterproof and dustproof effects of the foldable electronic device 100, thereby preventing moisture and dust outside the foldable electronic device 100 from entering inside of the foldable electronic device 100 through the first movement gap G, and further ensuring that the first housing 21 moves relative to the hinge assembly 23 without much obstruction. A material of the first flexible sealing member 256 includes, but is not limited to, silicone, rubber, or sealing foam. There may be one first flexible sealing member 256 or a plurality of first flexible sealing members 256 arranged in parallel.

Still referring to FIG. 10 and FIG. 11, the first flexible sealing member 256 is fastened to the first housing 21 and abuts against an outer surface of the shaft cover 24. Specifically, the first flexible sealing member 256 is fastened to the U-shaped plate formed by the first shielding plate 2121 and the first extension plate 214.

Specifically, still referring to FIG. 10 and FIG. 11, during the rotation of the first housing 21 relative to the shaft cover 24, the avoidance surface also rotates relative to the shaft cover 24 with the rotation of the first housing 21. Therefore, a position of the avoidance surface changes with respect to the shaft cover 24, which leads to a change in size of the first movement gap G. When the foldable electronic device 100 is in the folded state or the unfolded state, and the foldable electronic device 100 is changing between the folded state and the unfolded state, to keep the first flexible sealing member 256 as a seal between the first housing 21 and the shaft cover 24, the first flexible sealing member 256 is fastened to an end of the U-shaped plate farther away from the first side frame 213.

Figure 12:
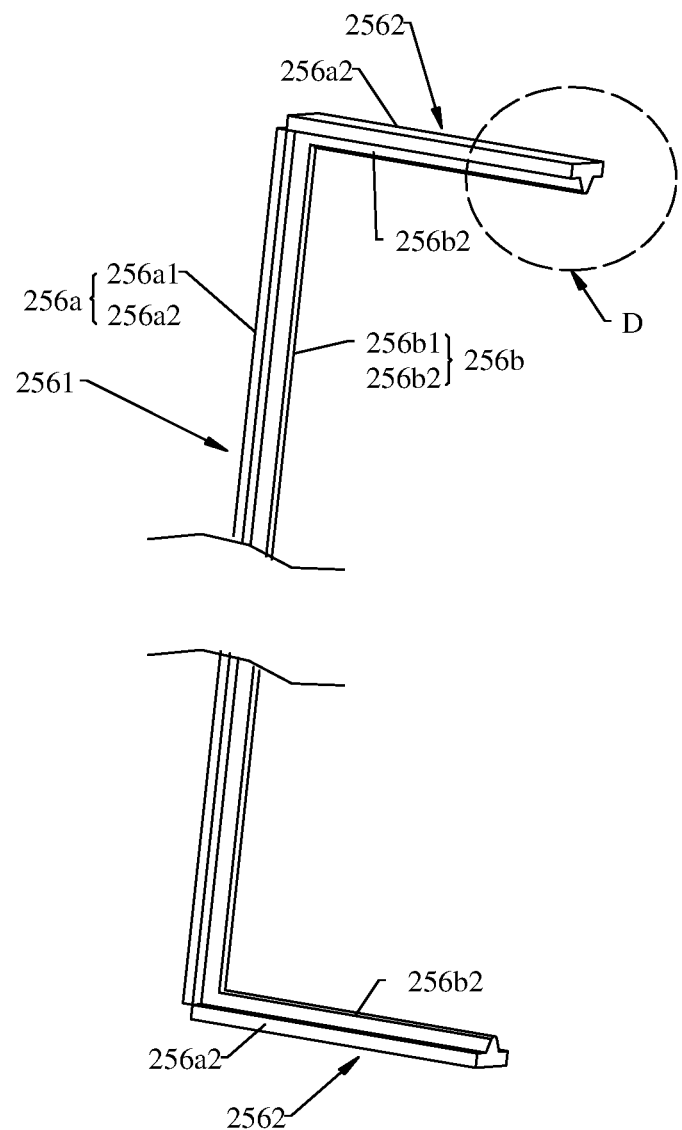
FIG. 12 is a three-dimensional diagram of a first flexible sealing member of the foldable electronic device shown in FIG. 9 to FIG. 11.

Referring to FIG. 12, FIG. 12 is a three-dimensional diagram of the first flexible sealing member 256 of the foldable electronic device 100 shown in FIG. 9 to FIG. 11. The first flexible sealing member 256 includes a first sealing segment 2561 and two second sealing segments 2562.

The first sealing segment 2561 is fastened to the first shielding plate 2121, and the first sealing segment 2561 extends to be a strip in the Y-axis direction. In the unfolded state, the first sealing segment 2561 is located on a side of the shaft cover 24 farther away from the foldable screen 10 and abuts against a bottom plate 241 of the shaft cover 24 (with reference to FIG. 10). In the folded state, the first sealing segment 2561 is located on a side of the shaft cover 24 in the X-axis direction, that is, the first sealing segment 2561 is located on the side that the first side plate 2421 faces toward, and abuts against the first side plate 2421(with reference to FIG. 11). In this way, the first sealing segment 2561 is used to seal the first gap G1.

In some embodiments, to ensure that the first sealing segment 2561 always seals the first gap G1 during the rotation of the first housing 21 relative to the shaft cover 24, and to prevent the first sealing segment 2561 from obstructing a relative rotation between the first housing 21 and the shaft cover 24, part of the outer peripheral surface of the shaft cover 24 forms an arc-shaped abutting surface S1. A center line of the arc-shaped abutting surface S1 is collinear with a rotation axis of the first housing 21. The first sealing segment 2561 abuts against the arc-shaped abutting surface S1 (with reference to FIG. 10 and FIG. 11). In this way, during the rotation of the first housing 21 relative to the shaft cover 24, consistent pre-tightening force is applied to the first sealing segment 2561, preventing the first sealing segment 2561 from interfering with the rotation of the first housing 21 relative to the shaft cover 24.

To adapt to the arc-shaped abutting surface S1, at least part of the avoidance surface may also be an arc-shaped surface. Certainly, the avoidance surface may alternatively not be an arc-shaped surface, but a right-angled surface (that is, the first side surface is perpendicular to the first shielding plate).

The two second sealing segments 2562 are respectively disposed at two ends of the first sealing segment 2561 in a length direction, and the second sealing segment 2562 is substantially perpendicular to the first sealing segment 2561. The two second sealing segments 2562 are respectively fastened to corresponding first extension plates 214 and abut against ends of the shaft cover 24 (that is, the first end plate 2423 and the second end plate 2424), to seal the second gap G2. Each of the second sealing segments 2562 is strip-shaped.

Specifically, the first flexible sealing member 256 is integrally formed with a wall plate in which the first flexible sealing member 256 is located. In other words, in this embodiment, the first flexible sealing member 256 is integrally formed with the U-shaped plate formed by the first shielding plate 2121 and the first extension plate 214, thereby improving connection strength between the first flexible sealing member 256 and the U-shaped plate, simplifying a processing technology, and reducing production costs. For example, the first flexible sealing member 256 may be integrally formed with the U-shaped plate through two-color injection molding. It can be understood that the first flexible sealing member 256 is not limited to being integrally formed with the U-shaped plate. The first flexible sealing member 256 may alternatively be formed separately, and then bonded to the U-shaped plate through dispensing or back gluing. This is not limited, as long as, the first flexible sealing member 256 can be fastened to the first housing 21.

Still referring to FIG. 12, the first flexible sealing member 256 includes a flexible body portion 256a and a flexible abutting rib 256b. The flexible body portion 256a includes a first body portion 256a1 and two second body portions 256a2. The two second body portions 256a2 are respectively disposed at two ends of the first body portion 256a1 in a length direction, and the second body portions 256a2 are substantially perpendicular to the first body portion 256a1. The first body portion 256a1 is fastened to the first shielding plate 2121. The two second body portions 256a2 are in one-to-one correspondence with the two first extension plates 214, and each of the second body portions 256a2 is fastened to a corresponding first extension plate 214.

The flexible abutting rib 256b is fastened to the flexible body portion 256a. Specifically, the flexible abutting rib 256b includes a first rib segment 256b1 and two second rib segments 256b2. The first rib segment 256b1 is fastened to the first body portion 256a1. In this way, the first rib segment 256b1 and the first body portion 256a1 can define the first sealing segment 2561. The first rib segment 256b1 abuts against the outer peripheral surface of the shaft cover 24 (for example, the arc-shaped abutting surface S1).

Figure 13:
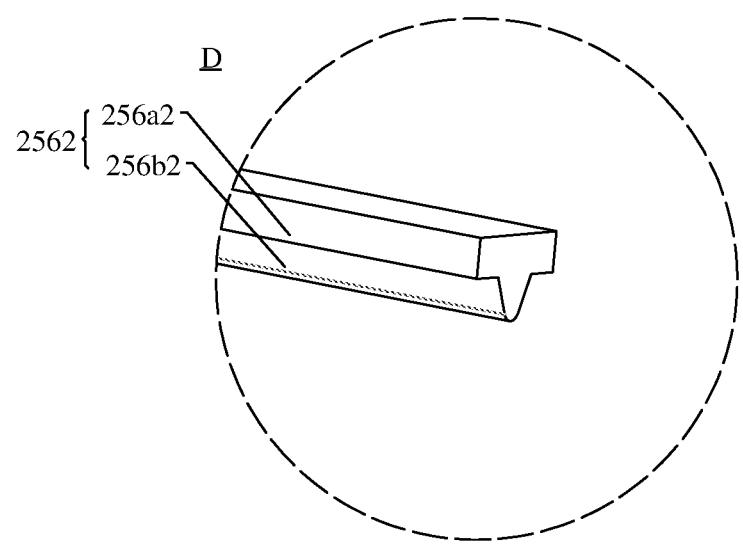
FIG. 13 is a partial enlarged view of the first flexible sealing member at position D shown in FIG. 12.

The two second rib segments 256b2 are respectively disposed at two ends of the first rib segment 256b1 in a length direction. The two second rib segments 256b2 are in one-to-one correspondence with the two second body portions 256a2, and each of the second rib segments 256b2 is fastened to a corresponding second body portion 256a2. In this way, the second body portion 256a2 and the second rib segment 256b2 located on the second body portion 256a2 can define the second sealing segment 2562. The two second rib segments 256b2 respectively abut against two side end surfaces (that is, the first end plate 2423 and the second end plate 2424) of the shaft cover 24 in the Y-axis direction. Such arrangement helps completely seal the first movement gap G to improve a sealing effect. For example, referring to FIG. 13, FIG. 13 is a partial enlarged view of the first flexible sealing member 256 at position D shown in FIG. 12. A cross section of the flexible abutting rib 256b (that is, the first rib segment 256b1 and the second rib segment 256b2) is triangular, semicircular, or wedge-shaped.

Figure 14:
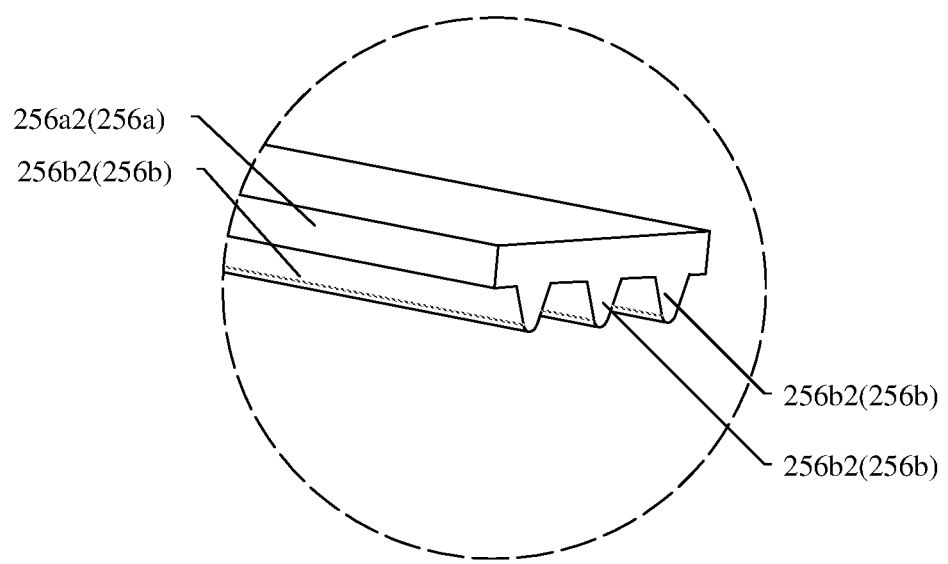
FIG. 14 is a partial enlarged view of a first flexible sealing member according to another embodiment of this application.

One flexible abutting rib 256b is provided. Certainly, this application is not limited thereto. To improve a sealing effect of the first flexible sealing member 256, refer to FIG. 14. FIG. 14 is a partial enlarged view of a first flexible sealing member 256 according to another embodiment of this application. A plurality of flexible abutting ribs 256b is provided. The plurality of flexible abutting ribs 256b are arranged on the flexible body portion 256a in parallel and spaced apart. An avoidance space may be formed between two adjacent flexible abutting ribs 256b to give room for the flexible abutting rib 256b to deform when the flexible abutting rib 256b abuts against the shaft cover 24. Specifically, in the example shown in FIG. 14, there are three flexible abutting ribs 256b. Certainly, it can be understood that there may alternatively be two, four, or six flexible abutting ribs 256b, as long as a quantity of flexible abutting ribs 256b is equal to or greater than 2.

Figure 15:
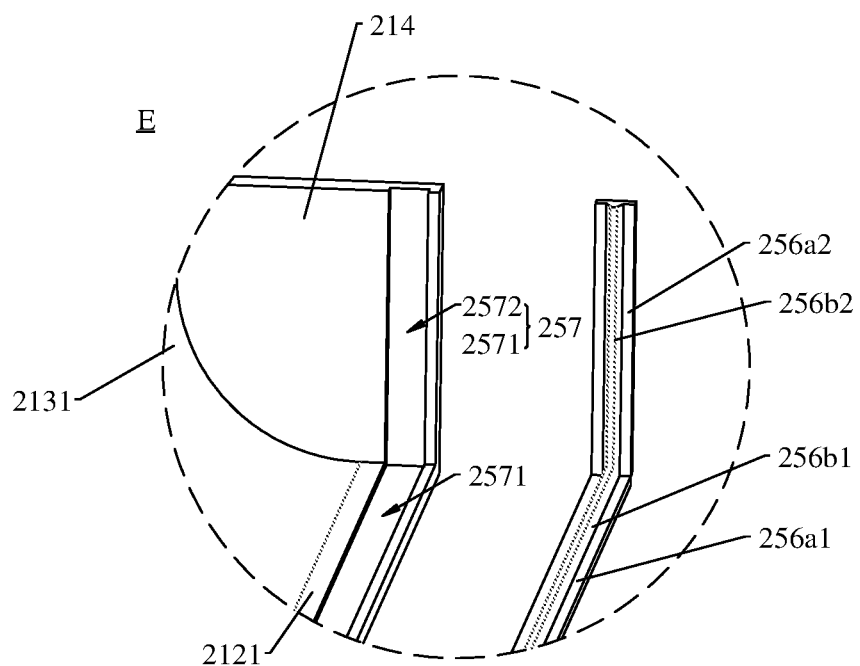
FIG. 15 is a partial enlarged view of the foldable electronic device at position E shown in FIG. 9.

Referring to FIG.15, FIG. 15 is a partial enlarged view of the foldable electronic device 100 at position E shown in FIG. 9. Specifically, the first housing 21 is provided with an embedded groove 257, and the embedded groove 257 may form a part of the first movement gap G. The flexible body portion 256a of the first flexible sealing member 256 is fastened inside the embedded groove 257. The flexible abutting rib 256b of the first flexible sealing member 256 is located outside the embedded groove 257 and abuts against the shaft cover 24.

Specifically, the embedded groove 257 includes a first groove segment 2571 and two second groove segments 2572. The first groove segment 2571 is formed on the first shielding plate 2121, and one second groove segment 2572 is formed on each first extension plate 214. The first body portion 256a1 is disposed in the first groove segment 2571, and the first rib segment 256b1 is located outside the first groove segment 2571. The second body portion 256a2 is correspondingly disposed in the second groove segment 2572, and the second rib segment 256b2 is located outside the second groove segment 2572.

In this embodiment of this application, the embedded groove 257 is disposed on the first housing 21, which helps accommodate part of the first flexible sealing member 256 by using the embedded groove 257, thereby limiting the first flexible sealing member 256 by using the embedded groove 257. This helps improve connection reliability between the first flexible sealing member 256 and the first housing 21 to prevent the first flexible sealing member 256 from being displaced during the rotation of the first housing 21 relative to the shaft cover 24.

Figure 16:
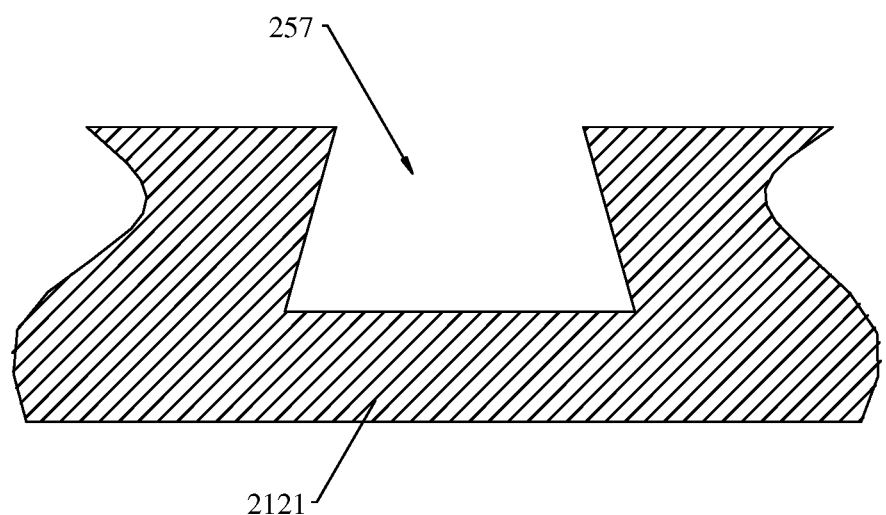
FIG. 16 is a schematic cross-sectional view of an embedded groove according to an embodiment of this application.

On this basis, to further improve a limiting effect of the embedded groove 257 on the first flexible sealing member 256, refer to FIG. 16. FIG. 16 is a schematic cross-sectional view of the embedded groove 257 according to an embodiment of this application. In a direction from a bottom surface of the embedded groove 257 to a notch of the embedded groove 257, opposite groove surfaces of the embedded groove 257 obliquely extend toward each other. In other words, for the first groove segment 2571, in a direction from a bottom surface of the first groove segment 2571 to a notch of the first groove segment 2571, opposite groove surfaces of the first groove segment 2571 obliquely extend toward each other; and for the second groove segment 2572, in a direction from a bottom surface of the second groove segment 2572 to a notch of the second groove segment 2572, opposite groove surfaces of the second groove segment 2572 obliquely extend toward each other. In this way, the embedded groove 257 may be formed as a dovetail groove, thereby improving the limiting effect of the embedded groove 257 on the first flexible sealing member 256 to ensure connection strength between the first flexible sealing member 256 and the first housing 21. Certainly, it can be understood that in other examples, in the direction from the bottom surface of the embedded groove 257 to the notch of the embedded groove 257, the opposite groove surfaces of the embedded groove 257 obliquely extend in directions leaving each other, which facilitates forming or mounting of the first flexible sealing member 256.

Figure 17:
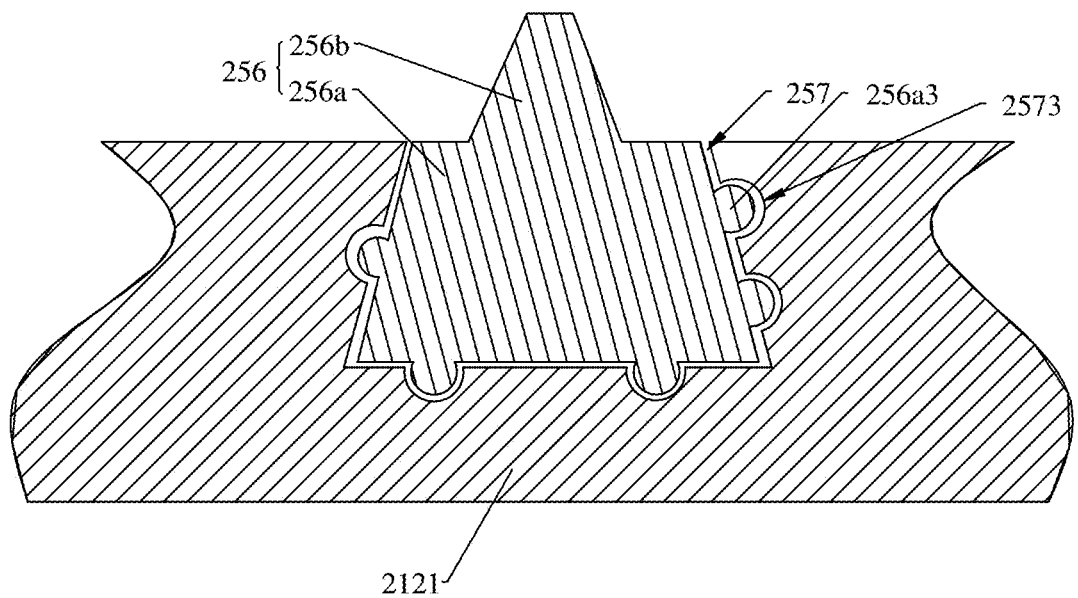
FIG. 17 is a schematic cross-sectional view of cooperation between an embedded groove according to another embodiment of this application and a first flexible sealing member.

On this basis, to further improve the limiting effect of the embedded groove 257 on the first flexible sealing member 256, refer to FIG. 17. FIG. 17 is a schematic cross-sectional view of cooperation between an embedded groove 257 according to another embodiment of this application and the first flexible sealing member 256. A retaining groove 2573 is formed on a groove surface of the embedded groove 257 (for example, the groove surface of the first groove segment 2571 and/or the groove surface of the second groove segment 2572). A protruding portion 256a3 matching the retaining groove 2573 is formed on the flexible body portion 256a. For example, the retaining groove 2573 may be provided in plurality. For another example, among the plurality of retaining grooves 2573, some of the retaining grooves 2573 are located on the bottom surface of the embedded groove 257, and other retaining grooves 2573 are located on a side surface of the embedded grooves 257.

Figure 18:
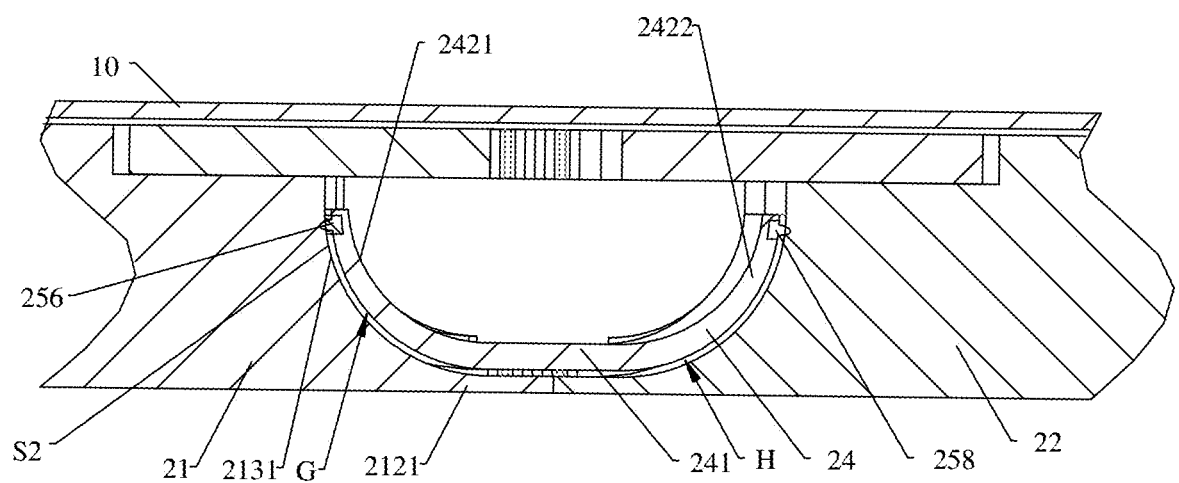
FIG. 18 is a schematic partial cross-sectional view of a foldable electronic device in an unfolded state according to a third embodiment of this application.
Figure 19:
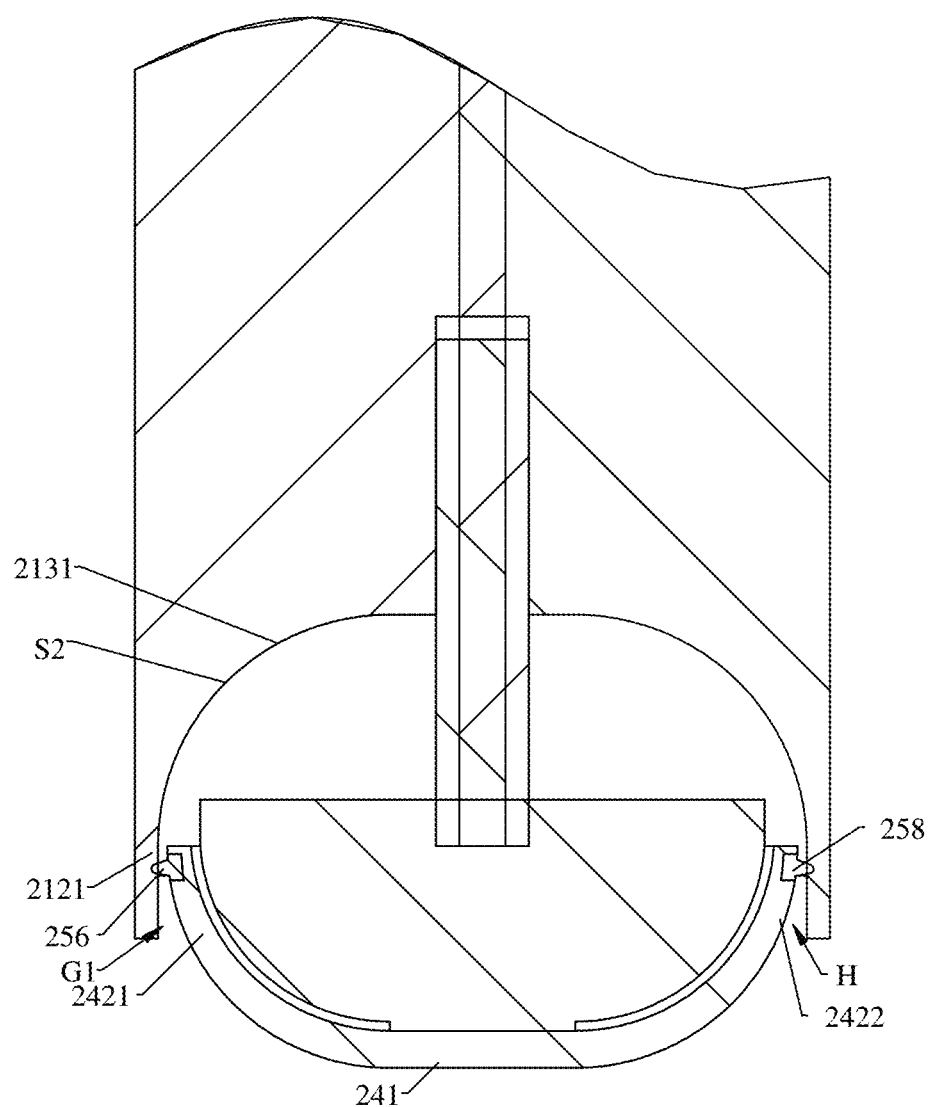
FIG. 19 is a schematic partial cross-sectional view of the foldable electronic device shown in FIG. 18 when in a folded state.

Referring to FIG. 18 and FIG. 19, FIG. 18 is a schematic partial cross-sectional view of a foldable electronic device 100 in an unfolded state according to a third embodiment of this application; and FIG. 19 is a schematic partial cross-sectional view of the foldable electronic device 100 shown in FIG. 18 when in a folded state. Different from the embodiment shown in FIG. 9 to FIG. 17, in this embodiment, the first flexible sealing member 256 is fastened to the shaft cover 24. In addition, to ensure that the first flexible sealing member 256 can always seal the gap between the first housing 21 and the shaft cover 24 during the rotation of the first housing 21 relative to the shaft cover 24, the first flexible sealing member 256 is located on a part of a first side plate 2421 of the shaft cover 24 closer to the foldable screen 10.

Further, the first body portion 256a1 of the first sealing segment 2561 is fastened to the outer peripheral surface of the shaft cover 24. In the unfolded state, the first rib segment 256b1 of the first sealing segment 2561 abuts against the first side surface 2131 (with reference to FIG. 18). In the folded state, the first rib segment 256b1 of the first sealing segment 2561 abuts against the first shielding plate 2121 (with reference to FIG. 19). The second body portion 256a2 of the second sealing segment 2562 is fastened to end surfaces of two ends of the shaft cover 24 in the Y-axis direction, and the second rib segment 256b2 of the second sealing segment 2562 abuts against a corresponding first extension plate 214.

In some embodiments, to ensure that the first sealing segment 2561 always seals the first gap G1 during the rotation of the first housing 21 relative to the shaft cover 24, and to prevent the first sealing segment 2561 from obstructing the relative rotation between the first housing 21 and the shaft cover 24, the avoidance surface has the arc-shaped abutting surface S2. A center line of the arc-shaped abutting surface S2 is collinear with a rotation axis of the first housing 21. For example, the avoidance surface is formed as the arc-shaped contact surface S2. The first rib segment 256b1 of the first sealing segment 256 abuts against the arc-shaped abutting surface S2 (with reference to FIG. 18 and FIG. 19). In this way, during the rotation of the first housing 21 relative to the shaft cover 24, consistent pre-tightening force is applied to the first sealing segment 2561, preventing the first sealing segment 2561 from interfering with the rotation of the first housing 21 relative to the shaft cover 24.

On this basis, the first flexible sealing member 256 is integrally formed with the shaft cover 24, thereby improving connection strength between the first flexible sealing member 256 and the shaft cover 24, simplifying a processing technology, and reducing production costs. For example, the first flexible sealing member 256 may be integrally formed with the shaft cover 24 through two-color injection molding. The first flexible sealing member 256 is not limited to being integrally formed with the shaft cover 24. The first flexible sealing member 256 may alternatively be formed separately, and then bonded to the shaft cover 24 through dispensing or back gluing.

Further, to limit the first flexible sealing member 256, the embedded groove 257 may be formed on the shaft cover 24 (that is, the first groove segment 2571 is formed on the first side plate 2421, and the second groove segment 2572 is separately formed on the first end plate 2423 and the second end plate 2424), and the flexible body portion 256a of the first flexible sealing member 256 is fastened inside the embedded groove 257.

Figure 20:
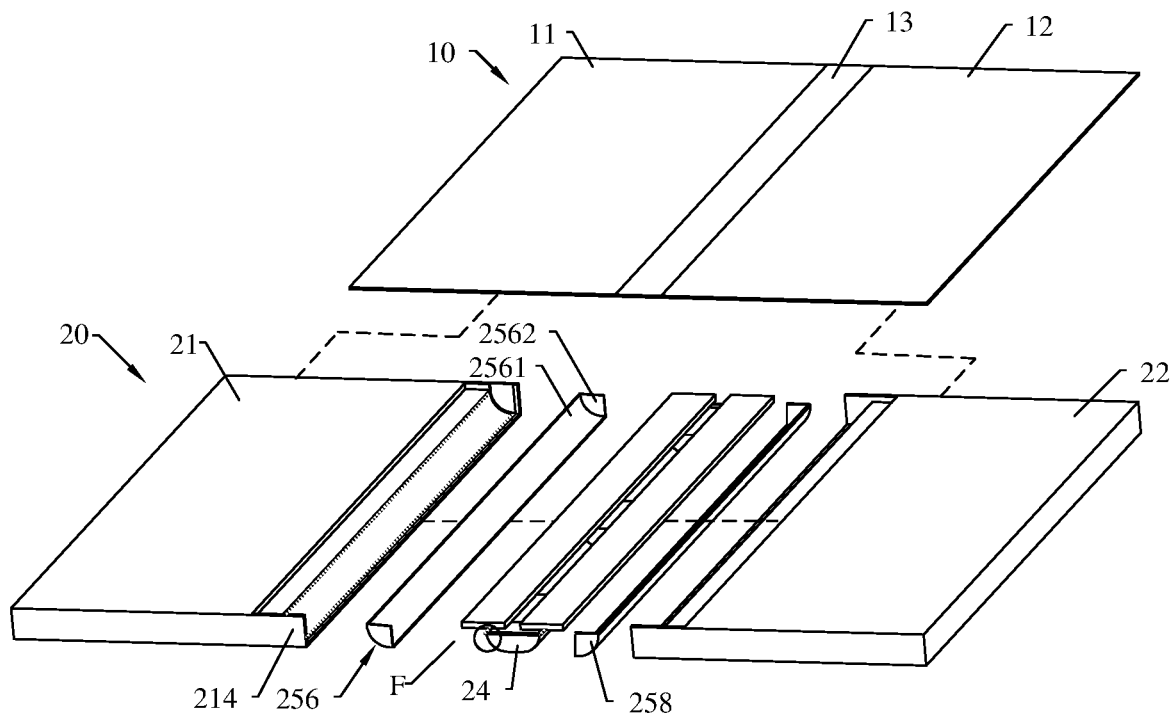
FIG. 20 is an exploded view of a foldable electronic device according to a fourth embodiment of this application.
Figure 21:
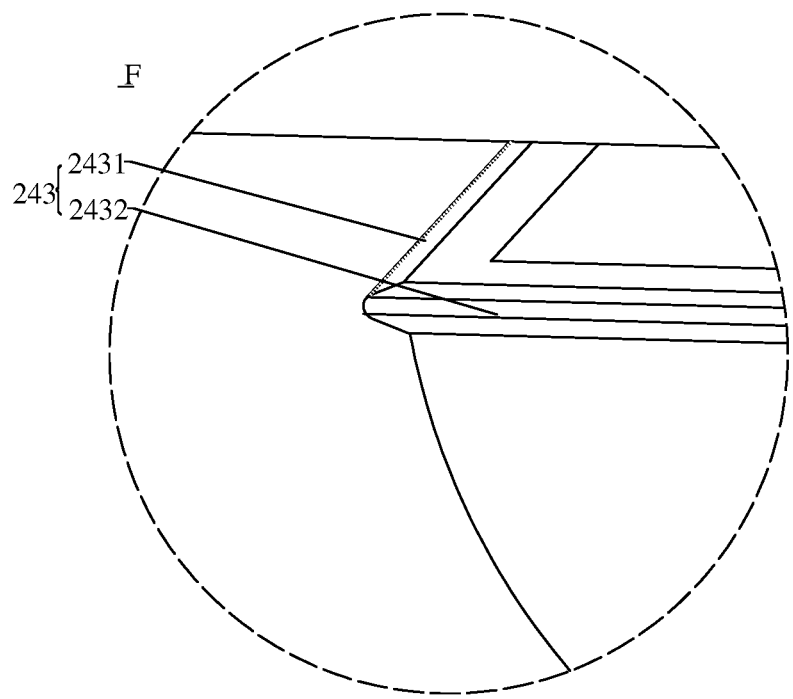
FIG. 21 is a partial enlarged view of the foldable electronic device at position F shown in FIG. 20.

Referring to FIG. 20 and FIG. 21, FIG. 20 is an exploded view of a foldable electronic device 100 according to a fourth embodiment of this application; and FIG. 21 is a partial enlarged view of the foldable electronic device 100 at position F shown in FIG. 20. Different from the embodiment shown in FIG. 9 to FIG. 17, in this embodiment, the first flexible sealing member 256 no longer includes the flexible abutting rib 256b, but includes only the flexible body portion 256a. In other words, the first flexible sealing member 256 is formed by the flexible body portion 256a. A rib 243 is disposed on the shaft cover 24, and the rib 243 abuts against the flexible body portion 256a. To ensure that the flexible body portion 256a can always abut against the rib 243 during the rotation of the first housing 21 relative to the shaft cover 24, the rib 243 is disposed on a side of the shaft cover 24 closer to the foldable screen 10. Certainly, it can be understood that, in other examples, the rib 243 may alternatively be disposed on the avoidance surface of the first housing 21, and the flexible body portion 256a is fastened to the shaft cover 24.

Specifically, the rib 243 includes a first rib portion 2431 and two second rib portions 2432. The first rib portion 2431 is disposed at an end of the first side plate 2421 adjacent to the foldable screen 10, and the first rib portion 2431 extends in the Y-axis direction. The two second rib portions 2432 are respectively disposed at two ends of the first rib portion 2431 in a length direction. The two second rib portions 2432 are respectively located on end surfaces of two ends of the shaft cover 24 in the Y-axis direction, and each of the second rib portions 2432 extends in the X-axis direction.

Figure 22:
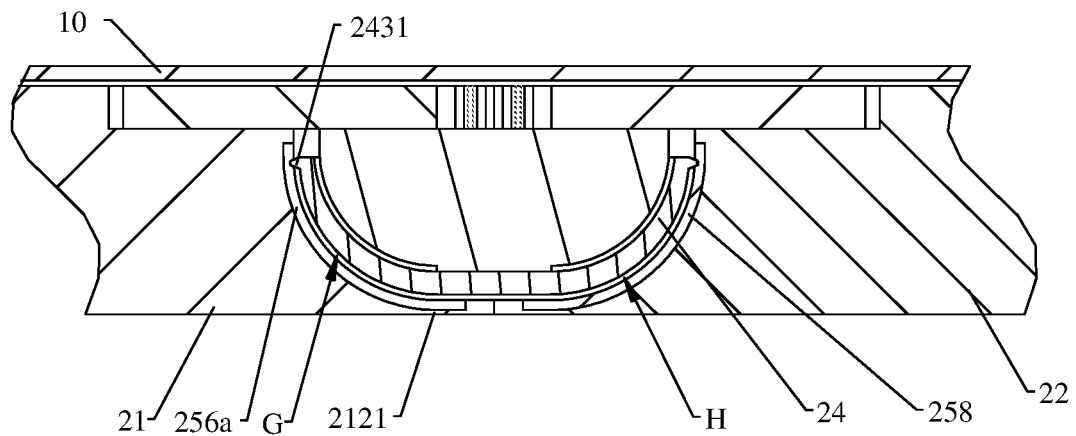
FIG. 22 is a schematic partial cross-sectional view of the foldable electronic device shown in FIG. 20 when in an unfolded state.
Figure 23:
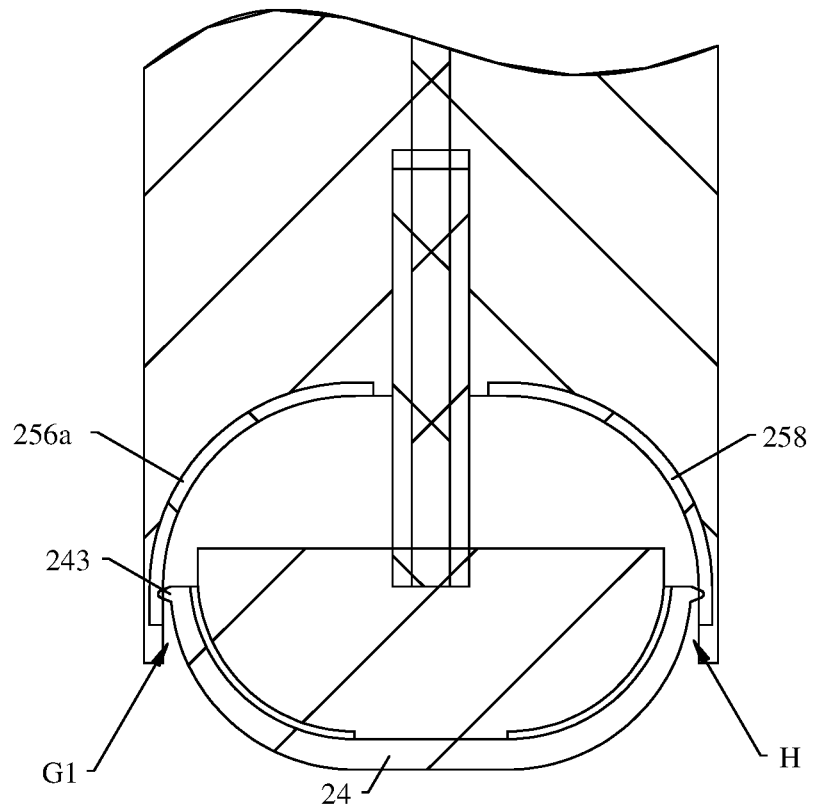
FIG. 23 is a schematic partial cross-sectional view of the foldable electronic device shown in FIG. 20 when in a folded state.

The first body portion 256a1 is fastened to the avoidance surface. Specifically, part of the first body portion 256a1 is fastened to the first shielding plate 2121, and the remaining part of the first body portion 256a1 is fastened to the first side surface 2131. Referring to FIG. 22, FIG. 22 is a schematic partial cross-sectional view of the foldable electronic device 100 shown in FIG. 20 when in an unfolded state. In the unfolded state, the first rib portion 2431 abuts against the part of the first body portion 256a1 located on the first side surface 2131. Referring to FIG. 23, FIG. 23 is a schematic partial cross-sectional view of the foldable electronic device 100 shown in FIG. 20 when in a folded state. In the folded state, the first rib portion 2431 abuts against the part of the first body portion 256a1 located on the first shielding plate 2121.

For example, to ensure that the first body portion 256a1 cooperates with the first rib portion 2431 to always seal the first gap G1 during the rotation of the first housing 21 relative to the shaft cover 24, and to prevent the cooperation of the first body portion 256a1 and the first rib portion 2431 from obstructing the rotation of the first housing 21 relative to the shaft cover 24, the first body portion 256a1 is an arc-shaped sheet. A center line of the first body portion 256a1 is collinear with the rotation axis of the first housing 21 (with reference to FIG. 22 and FIG. 23). In this way, during the rotation of the first housing 21 relative to the shaft cover 24, consistent pre-tightening force is applied to the first body portion 256a1, preventing the cooperation of the first body portion 256a1 and the first rib portion 2431 from interfering with the rotation of the first housing 21 relative to the shaft cover 24.

Because the first body portion 256a1 is made of a flexible material, to maintain an arc shape of the first body portion 256a1, the avoidance surface is formed as an arc-shaped surface, and a center line of the avoidance surface is collinear with the rotation axis of the first housing 21.

The two second rib portions 2432 are in one-to-one correspondence with the two second body portions 256a2, and each of the second rib portions 2432 abuts against a corresponding second body portion 256a2. To adapt to the shape of the first body portion 256a1, and to ensure that the second body portion 256a2 cooperates with the second rib portion 2432 to always seal the second gap G2 during the rotation of the first housing 21 relative to the shaft cover 24, the second body portion 256a2 is a fan-shaped sheet.

In the embodiments of this application, the flexible body portion 256a forms the first flexible sealing member 256, which facilitates processing and manufacture of the first flexible sealing member 256, and also facilitates cooperation between the first flexible sealing member 256 and the rib 243. This prevents the flexible abutting rib 256b of the first flexible sealing member 256 from interfering with the rib 243 during the rotation of the first housing 21 relative to the shaft cover 24, thereby avoiding impact on a hand feel of rotating the foldable electronic device 100.

On this basis, to limit the first flexible sealing member 256, the first flexible sealing member 256 is entirely located in the embedded groove 257. The first groove segment 2571 of the embedded groove 257 is formed on the avoidance surface, and part of the first groove segment 2571 is located on the first shielding plate 2121, the other end of the first groove segment 2571 is located on the first side surface 2131, and the first groove segment 2571 is in an arc shape matching the shape of the first body portion 256a1. The second groove segment 2572 is in a fan shape matching the shape of the second body portion 256a2.

Figure 24:
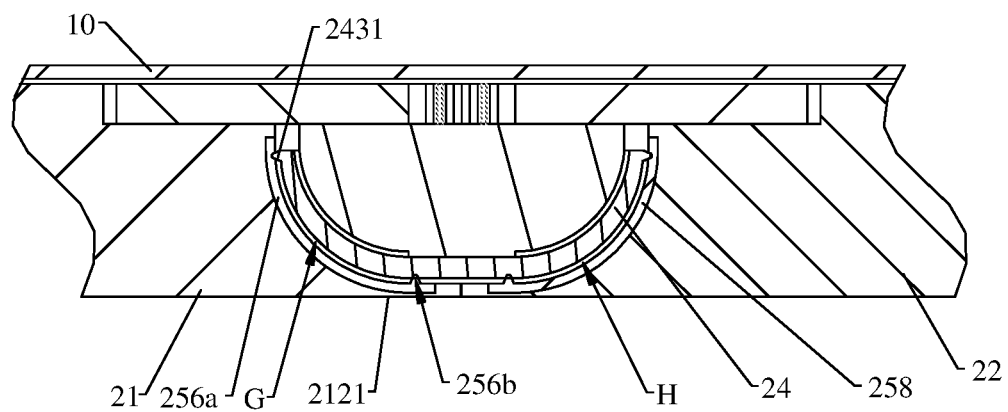
FIG. 24 is a schematic partial cross-sectional view of a foldable electronic device in an unfolded state according to a fifth embodiment of this application.
Figure 25:
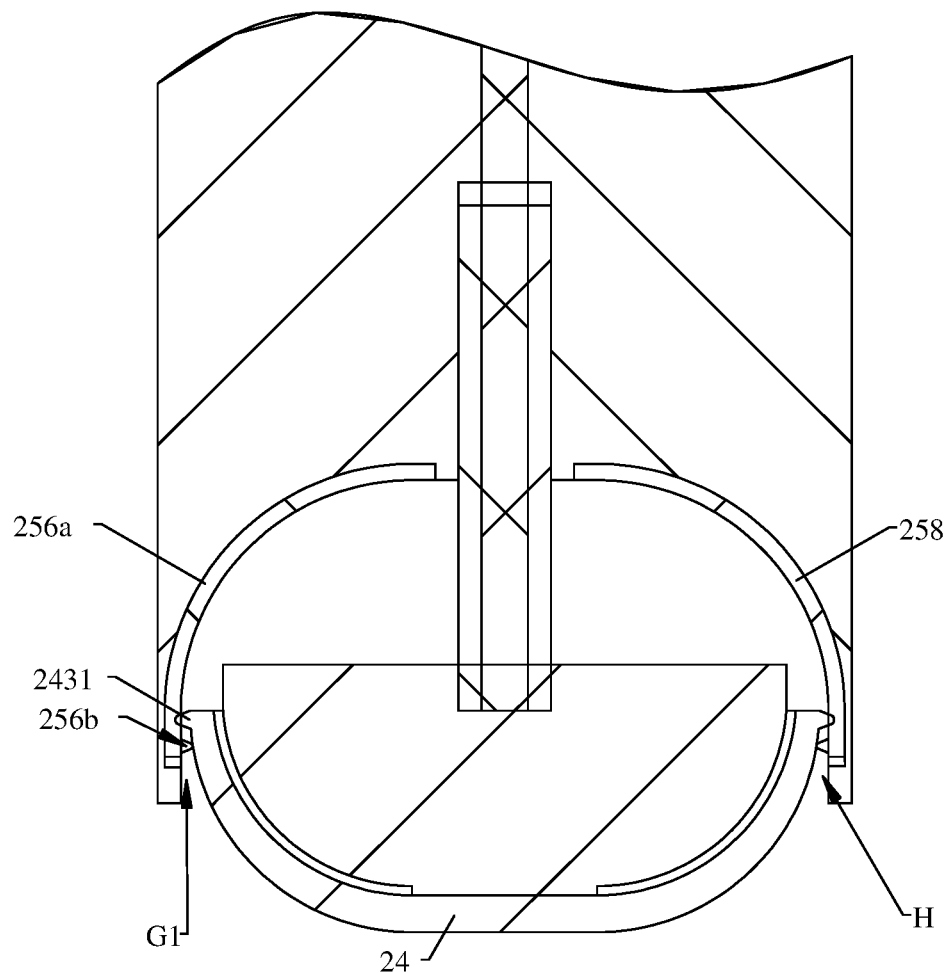
FIG. 25 is a schematic partial cross-sectional view of the foldable electronic device shown in FIG. 24 when in a folded state.

Referring to FIG. 24 and FIG. 25, FIG. 24 is a schematic partial cross-sectional view of a foldable electronic device 100 in an unfolded state according to a fifth embodiment of this application; and FIG. 25 is a schematic partial cross-sectional view of the foldable electronic device 100 shown in FIG. 24 when in a folded state. Different from the embodiment shown in FIG. 9 to FIG. 17, in this embodiment, the rib 243 is disposed on the shaft cover 24, and the rib 243 abuts against the flexible body portion 256a. To ensure that the flexible body portion 256acan always abut against the rib 243 during the rotation of the first housing 21 relative to the shaft cover 24, the rib 243 is disposed on a side of the shaft cover 24 closer to the foldable screen 10.

In this way, while the flexible abutting rib 256b of the first flexible sealing member 256 abuts against the shaft cover 24, the rib 243 on the shaft cover 24 may also abut against the flexible body portion 256a, thereby achieving a good sealing effect through double sealing.

Specifically, the rib 243 includes a first rib portion 2431 and two second rib portions 2432. The first rib portion 2431 is disposed at an end of the first side plate 2421 adjacent to the foldable screen 10, and the first rib portion 2431 extends in the Y-axis direction. The two second rib portions 2432 are respectively disposed at two ends of the first rib portion 2431 in a length direction. The two second rib portions 2432 are respectively located on end surfaces of two ends of the shaft cover 24 in the Y-axis direction, and each of the second rib portions 2432 extends in the X-axis direction.

The first body portion 256a1 is fastened to the avoidance surface. Specifically, part of the first body portion 256a1 is fastened to the first shielding plate 2121, and the remaining part of the first body portion 256a1 is fastened to the first side surface 2131. Referring to FIG. 24, in the unfolded state, the first rib portion 2431 abuts against the part of the first body portion 256a1 located on the first side surface 2131. Referring to FIG. 25, in the folded state, the first rib portion 2431 abuts against the part of the first body portion 256a1 located on the first shielding plate 2121.

For example, to ensure that the first body portion 256a1 cooperates with the first rib portion 2431 to always seal the first gap G1 during the rotation of the first housing 21 relative to the shaft cover 24, and to prevent the cooperation of the first body portion 256a1 and the first rib portion 2431 from obstructing the rotation of the first housing 21 relative to the shaft cover 24, the first body portion 256a1 is an arc-shaped sheet. A center line of the first body portion 256a1 is collinear with the rotation axis of the first housing 21 (with reference to FIG. 22 and FIG. 23). In this way, during the rotation of the first housing 21 relative to the shaft cover 24, consistent pre-tightening force is applied to the first body portion 256a1, preventing the cooperation of the first body portion 256a1 and the first rib portion 2431 from interfering with the rotation of the first housing 21 relative to the shaft cover 24.

Because the first body portion 256a1 is made of a flexible material, to maintain an arc shape of the first body portion 256a1, the avoidance surface is formed as an arc-shaped surface, and a center line of the avoidance surface is collinear with the rotation axis of the first housing 21.

The two second rib portions 2432 are in one-to-one correspondence with the two second body portions 256a2, and each of the second rib portions 2432 abuts against a corresponding second body portion 256a2. To adapt to the shape of the first body portion 256a1, and to ensure that the second body portion 256a2 cooperates with the second rib portion 2432 to always seal the second gap G2 during the rotation of the first housing 21 relative to the shaft cover 24, the second body portion 256a2 is a fan-shaped sheet.

On this basis, to limit the first flexible sealing member 256, the first groove segment 2571 of the embedded groove 257 is formed on the avoidance surface, and part of the first groove segment 2571 is located on the first shielding plate 2121, the remaining part of the first groove segment 2571 is located on the first side surface 2131, and the first groove segment 2571 is in an arc shape matching the shape of the first body portion 256a1. The second groove segment 2572 is in a fan shape matching the shape of the second body portion 256a2.

According to any one of the foregoing embodiments, referring to FIG. 9 and FIG. 10 again, to ensure that the second housing 22 rotates relative to the shaft cover 24 without interference, a second movement gap H is formed between the second housing 22 and the shaft cover 24. To improve a sealing effect on the second movement gap H, the support apparatus 20 further includes a second flexible sealing member 258, and the second flexible sealing member 258 fits into and seals the second movement gap H. Because the second flexible sealing member 258 is compact, non-porous, soft, and deformable, the second flexible sealing member 258 is used to seal the second movement gap H to achieve waterproof and dustproof effects of the foldable electronic device 100, thereby preventing moisture and dust outside the foldable electronic device 100 from entering inside of the foldable electronic device 100 through the second movement gap H, and further ensuring that the second housing 22 moves relative to the hinge assembly 23 without much obstruction. A material of the second flexible sealing member 258 includes, but is not limited to, silicone, rubber, or sealing foam. There may be one second flexible sealing member 258 or a plurality of second flexible sealing members 258 arranged in parallel.

The second flexible sealing member 258 has a same structure as the first flexible sealing member 256, and a cooperation relationship between the second flexible sealing member 258 and the second housing 22 is the same as a cooperation relationship between the first flexible sealing member 256 and the first housing 21. A cooperation relationship between the second flexible sealing member 258 and the shaft cover 24 is the same as a cooperation relationship between the first flexible sealing member 256 and the shaft cover 24. Therefore, a specific structure of the second flexible sealing member 258 and the cooperation relationships between the second flexible sealing member 258 and the second housing 22 and the shaft cover 24 are not described in detail herein.

The specific features, structures, materials, or characteristics described in this specification may be combined in a suitable manner in any one or more embodiments or examples.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A support apparatus, comprising:
   a hinge assembly, wherein the hinge assembly comprises a rotating shaft mechanism and a shaft cover, and the rotating shaft mechanism is at least partly accommodated in an accommodation space defined by the shaft cover;
   a first housing and a second housing, wherein the first housing and the second housing are respectively located on opposite sides of the hinge assembly, the first housing and the second housing are configured to rotate relative to the shaft cover through the rotating shaft mechanism, the first housing, the second housing, and the rotating shaft mechanism each have a support surface configured to support a foldable screen, and a first movement gap is between the first housing and an outer surface of the shaft cover; and
   a first flexible seal, wherein the first flexible seal fits into and seals the first movement gap;
   wherein an embedded groove extends in one of the first housing and the shaft cover, the first flexible seal comprises a flexible body, and the flexible body is disposed in the embedded groove; and
   wherein a retaining groove extends from a groove surface of the embedded groove, and a protruding portion adapted to the retaining groove is formed on the flexible body.

2. The support apparatus according to claim 1, wherein the first flexible seal further comprises a flexible abutting rib, and the flexible abutting rib is fastened to the flexible body and abuts against the other of the first housing and the shaft cover.

3. The support apparatus according to claim 1, wherein in a direction from a bottom surface of the embedded groove to an upper portion of the embedded groove, opposite groove surfaces defining the embedded groove obliquely extend toward each other.

4. The support apparatus according to claim 1, wherein the first flexible seal is integrally formed with a wall plate in which the first flexible seal is located.

5. The support apparatus according to claim 1, wherein the first housing comprises a first middle plate, a first back cover, and a first side frame, wherein the first middle plate and the first back cover are arranged opposite each other, the support surface of the first housing is on a surface of the first middle plate facing away from the first back cover, the first side frame is connected between the first middle plate and the first back cover and is arranged around a periphery of the first middle plate, one end of the first back cover adjacent to the shaft cover extends to form a first shielding plate, and the first side frame has a first side surface facing toward the shaft cover;
wherein in an unfolded state of the support apparatus, the support surface of the first housing, the support surface of the second housing, and the support surface of the rotating shaft mechanism are coplanar and face toward a same direction, the first shielding plate is located on a side of the shaft cover facing away from the foldable screen, and the first side surface is located on a side of the shaft cover farther away from the second housing; and
wherein in a folded state of the support apparatus, the first housing and the second housing are arranged opposite each other, the first shielding plate is located on a side of the shaft cover that faces away from the second housing, and the first side surface is located on a side of the shaft cover facing toward the foldable screen.

6. The support apparatus according to claim 5, wherein the first side surface and a surface of the first shielding plate that faces toward a same direction as the support surface of the first housing define an avoidance surface, and the first movement gap comprises a first gap located between the avoidance surface and an outer peripheral surface of the shaft cover; and
wherein the first flexible seal fits into and seals the first gap.

7. A support apparatus, comprising:
a hinge assembly, wherein the hinge assembly comprises a rotating shaft mechanism and a shaft cover, and the rotating shaft mechanism is at least partly accommodated in an accommodation space defined by the shaft cover;
a first housing and a second housing, wherein the first housing and the second housing are respectively located on opposite sides of the hinge assembly, the first housing and the second housing are configured to rotate relative to the shaft cover through the rotating shaft mechanism, the first housing, the second housing, and the rotating shaft mechanism each have a support surface configured to support a foldable screen, and a first movement gap is between the first housing and an outer surface of the shaft cover; and
a first flexible seal, wherein the first flexible seal fits into and seals the first movement gap;
wherein the first housing comprises a first middle plate, a first back cover, and a first side frame, wherein the first middle plate and the first back cover are arranged opposite each other, the support surface of the first housing is on a surface of the first middle plate facing away from the first back cover, the first side frame is connected between the first middle plate and the first back cover and is arranged around a periphery of the first middle plate, one end of the first back cover adjacent to the shaft cover extends to form a first shielding plate, and the first side frame has a first side surface facing toward the shaft cover;
wherein in an unfolded state of the support apparatus, the support surface of the first housing, the support surface of the second housing, and the support surface of the rotating shaft are coplanar and face toward a same direction, the first shielding plate is located on a side of the shaft cover facing away from the foldable screen, and the first side surface is located on a side of the shaft cover farther away from the second housing; and
wherein in a folded state of the support apparatus, the first housing and the second housing are arranged opposite each other, the first shielding plate is located on a side of the shaft cover that faces away from the second housing, and the first side surface is located on a side of the shaft cover facing toward the foldable screen;
wherein the first side surface and a surface of the first shielding plate that faces toward a same direction as the support surface of the first housing define an avoidance surface, and the first movement gap comprises a first gap located between the avoidance surface and an outer peripheral surface of the shaft cover; and
wherein the first flexible seal comprises a first sealing segment, wherein the first sealing segment fits into and seals the first gap; and
wherein the first sealing segment comprises a first body, wherein the first body is fastened to one of the avoidance surface and the outer peripheral surface of the shaft cover, the first body is an arc-shaped sheet, a center line of the first body is collinear with a rotation axis of the first housing, the other one of the first housing and the shaft cover is provided with a first rib, and the first rib abuts against the first body.

8. The support apparatus according to claim 7, wherein an arc-shaped surface adapted to the first body is formed on one of the avoidance surface and the outer peripheral surface of the shaft cover.

9. The support apparatus according to claim 6, wherein the first housing comprises two first extension plates, the two first extension plates are arranged opposite each other in an extension direction of a rotation axis of the first housing, each of the first extension plates is connected to the first side surface and the first shielding plate, and the shaft cover is located between the two first extension plates;
wherein the first movement gap comprises second gaps, and end surfaces of two ends of the shaft cover in the extension direction of the rotation axis of the first housing respectively form the second gaps with the two first extension plates; and
wherein the first flexible seal further comprises two second sealing segments, the two second sealing segments are in one-to-one correspondence with the second gaps, and each of the second sealing segments fits into and seals the corresponding second gap.

10. The support apparatus according to claim 1, wherein a second movement gap is between the second housing and the outer surface of the shaft cover; and
wherein the support apparatus further comprises a second flexible seal, and wherein the second flexible seal fits into and seals the second movement gap.

11. The support apparatus according to claim 10, wherein the second flexible seal has a same structure as the first flexible seal.

12. The support apparatus according to claim 1, wherein the first flexible seal is silicone or rubber.

13. A foldable electronic device, comprising:
a support apparatus, wherein the support apparatus comprises:
- a hinge assembly, wherein the hinge assembly comprises a rotating shaft mechanism and a shaft cover, and the rotating shaft mechanism is fastened to the shaft cover;
- a first housing and a second housing, wherein the first housing and the second housing are respectively located on opposite sides of the hinge assembly, the first housing and the second housing are configured to rotate relative to the shaft cover through the rotating shaft mechanism, the first housing, the second housing, and the rotating shaft mechanism each have a support surface configured to support a foldable screen, and a first movement gap is between the first housing and an outer surface of the shaft cover; and
- a first flexible seal, wherein the first flexible seal fits into and seals the first movement gap; and
the foldable screen, wherein the foldable screen comprises a first part, a second part, and a third part, the third part is connected between the first part and the second part, the first part provides support on and is fastened to the support surface of the first housing, the second part provides support on and is fastened to the support surface of the second housing, and the third part provides support on the support surface of the rotating shaft mechanism;

wherein an embedded groove extends in one of the first housing and the shaft cover, the first flexible seal comprises a flexible body, and the flexible body is disposed in the embedded groove; and wherein a retaining groove extends from a groove surface of the embedded groove, and a protruding portion adapted to the retaining groove is formed on the flexible body.

14. The foldable electronic device according to claim 13, wherein the first flexible seal further comprises a flexible abutting rib, the flexible body is fastened to one of the first housing or the shaft cover, and the flexible abutting rib is fastened to the flexible body and abuts against the other of the first housing and the shaft cover.

15. The support apparatus according to claim 7, wherein the first flexible seal is silicone.

16. The support apparatus according to claim 7, wherein the first flexible seal is rubber.

17. The foldable electronic device according to claim 13, wherein the first flexible seal is silicone.

18. The foldable electronic device according to claim 13, wherein the first flexible seal is rubber.

19. The foldable electronic device according to claim 13, wherein in a direction from a bottom surface of the embedded groove to an upper portion of the embedded groove, opposite groove surfaces defining the embedded groove obliquely extend toward each other.

* * * * *